(12) United States Patent
Watanabe et al.

(10) Patent No.: US 8,527,220 B2
(45) Date of Patent: Sep. 3, 2013

(54) VORTEX EXTRACTION APPARATUS, METHOD, PROGRAM STORAGE MEDIUM, AND DISPLAY SYSTEM

(75) Inventors: Masahiro Watanabe, Kawasaki (JP); Teruo Matsuzawa, Nomi (JP); Yoshimasa Kadooka, Kawasaki (JP)

(73) Assignees: Fujitsu Limited, Kawasaki (JP); Japan Advanced Institute of Science and Technology, Ishikawa (JP)

( * ) Notice: Subject to any disclaimer, the term of this patent is extended or adjusted under 35 U.S.C. 154(b) by 448 days.

(21) Appl. No.: 12/926,711

(22) Filed: Dec. 6, 2010

(65) Prior Publication Data
US 2011/0144928 A1    Jun. 16, 2011

(30) Foreign Application Priority Data
Dec. 16, 2009   (JP) ................. 2009-285535

(51) Int. Cl.
*G06F 17/00*   (2006.01)

(52) U.S. Cl.
USPC .......................................................... 702/50

(58) Field of Classification Search
USPC ................. 702/55, 45–54, 182–185
See application file for complete search history.

(56) References Cited

U.S. PATENT DOCUMENTS

| | | | |
|---|---|---|---|
| 7,765,090 B2 | 7/2010 | Nakayama et al. | |
| 8,099,265 B2 * | 1/2012 | Houston | 703/9 |
| 2007/0294066 A1 | 12/2007 | Nakayama et al. | |

FOREIGN PATENT DOCUMENTS

| | | |
|---|---|---|
| JP | 2000-339297 | 12/2000 |
| JP | 2001-132700 | 5/2001 |
| JP | 2005-309999 | 11/2005 |

OTHER PUBLICATIONS

David Sujudi et al., "Identification of Swirling Flow in 3-D Vector Fields," American Institute of Aeronautics and Astronautics, Inc., 1995, pp. 1-8.
Tino Weinkauf et al., "Cores of Swirling Particle Motion in Unsteady Flows," IEEE Transactions on Visualization and Computer Graphics, vol. 13, No. 6, 2007, pp. 1759-1766.
Jinhee Jeong et al., "On the Identification of a Vortex," J. Fluid Mech. vol. 285, 1995, pp. 69-94.
William E. Lorensen et al., "Marching Cubes: A High Resolution 3D Surface Construction Algorithm," General Electric Company, 1987, 13pp.

* cited by examiner

*Primary Examiner* — Edward Raymond
(74) *Attorney, Agent, or Firm* — Staas & Halsey LLP

(57) ABSTRACT

A vortex extraction apparatus includes: a first numerical data calculation section calculating, for each vertex of each of voxels into which the inside of a fluid space is split, first numerical data indicating whether the vertex is located inside or outside a vortex region in a fluid; and a text data creation section determining the size of the vortex region around a center line of the vortex based on the first numerical data, and creating text data indicating the center line and the size. The apparatus further includes a polygon count reduction processing section counting the number of polygons defining a surface of the vortex region and each including an isosurface of the first numerical data, and integrating the voxels with new voxels into which the fluid space is roughly split until the number of polygons is not more than a set value, to decimate the first numerical data.

10 Claims, 21 Drawing Sheets (A)  (B)

(A)  (B)

(A)  (B)

VORTEX EXTRACTION APPARATUS, METHOD, PROGRAM STORAGE MEDIUM, AND DISPLAY SYSTEM

CROSS-REFERENCE TO RELATED APPLICATION

This application is based upon and claims the benefit of priority of the prior Japanese Patent Application No. 2009-285535, filed on Dec. 16, 2009, the entire contents of which are incorporated herein by reference.

FIELD

The embodiment discussed herein is related to a vortex extraction apparatus and method in which vortices in a fluid space are extracted. Furthermore, the embodiment is related to a non-transitory computer-readable storage medium that stores a vortex extraction program executed by an arithmetic apparatus that executes the program and causing the arithmetic apparatus to operate as a vortex extraction apparatus. Moreover, the embodiment is related to a vortex extraction display system including a vortex extraction apparatus and a vortex display apparatus that displays vortices extracted by the vortex extraction apparatus.

BACKGROUND

A technique to extract and visualize vortices in a fluid space is preferable for determining the behavior of a fluid in various fields including, for example, the behavior of wind around wings of an airplane, water flows around screws of a ship, and air flowing through the human trachea.

Various techniques to extract vortices have been proposed in order to realize visualization of the vortices. A major challenge to the visualization technique is to handle a very large amount of data in order to extract vortices accurately. Thus, a high-speed large-sized arithmetic machine that handles a large amount of data at a high speed is preferably used. The amount of calculation for vortex extraction is preferably reduced. However, a greater challenge is the level of the visualization. In association with a large amount of data used for the calculation for the vertex extraction, a large amount of data is used to express extracted vortices. Thus, the visualization process is difficult to achieve unless a computer is used which is specified so as to demonstrate the same level of performance as that of the computer used for the vortex extraction. That is, visualization with an insufficiently specified computer leads to slow responses to operations such as rotation, movement, enlargement, and reduction of displayed vortices. Thus, obtaining preferable display is difficult. Furthermore, the vortices vary momentarily. Hence, temporal variations in vortices are preferably determined in order to know the behavior of the vortices. However, owing to the large amount of data used for the vortex extraction, visualizing temporal variations in vortices is difficult.

When the data is decimated for visualization in order to achieve a high-speed visualization process, important phenomena may be lost by the decimation and fail to be displayed despite having spent the calculation cost to accurately extract the vortex. Thus, such phenomena may be missed.

The followings are documents related to the vortex extraction, documents disclosing examples of a region splitting method for allowing a large amount of data to be handled, and documents to be refer to in the description provided later.
(1) Japanese Laid-Open Patent Publication No. 2001-132700
(2) Japanese Laid-Open Patent Publication No. 2005-309999
(3) Japanese Laid-Open Patent Publication No. 2000-339297
(4) D. Sujudi, R. Haimes, IDENTIFICATION OF SWIRLING FLOW IN 3-D VECTOR FIELDS, Paper of American Institute of Aeronautics and Astronautics, 1995
(5) T. Weinkauf, Cores of Swirling Particle Motion in Unsteady Flows, Paper of IEEE, 2007
(6) On the identification of a vortex, Jinhee Jeong and Fazle Hussain, Jaurnal of fluid mechanics, vol. 285, pp 64-94, 1995
(7) Marching cubes: A high resolution 3 D surface construction algorithm, William E. Lorensen, Harvey E. Cline, Proceedings of the 14th annual conference on Computer graphics and interactive techniques, Pages: 163-169, 1987

SUMMARY

According to an aspect of the invention, a vortex extraction apparatus includes:
a data acquisition section that acquires flow velocity data at points distributed in a fluid space;
a first numerical data calculation section that calculates, for each vertex of each of voxels into which the inside of the fluid space is split, first numerical data indicating whether the vertex is located inside or outside a vortex region in the fluid, based on the flow velocity data acquired by the data acquisition section;
a text data creation section that determines a center line of the vortex in the fluid based on the flow velocity data acquired by the data acquisition section and determines the size of the vortex region around the center line based on the first numerical data on each vertex calculated by the first numerical data calculation section, the text data creation section creating text data indicative of the center line and the size;
a polygon count reduction processing section that counts the number of polygons defining a surface of the vortex region and each including an isosurface of the first numerical data calculated by the first data calculation section and integrates the voxels with new voxels into which the fluid space is roughly split until the number of polygons is equal to or smaller than a set value, to decimate the first numerical data and thereby obtain first numerical data corresponding to each vertex of each of the new voxels; and
a data output section that outputs the text data created by the text data creation section and the first numerical data obtained by the polygon count reduction processing section and corresponding to each vertex of each of the new voxels.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Embodiments of the present invention will be described below.

Figure 1:
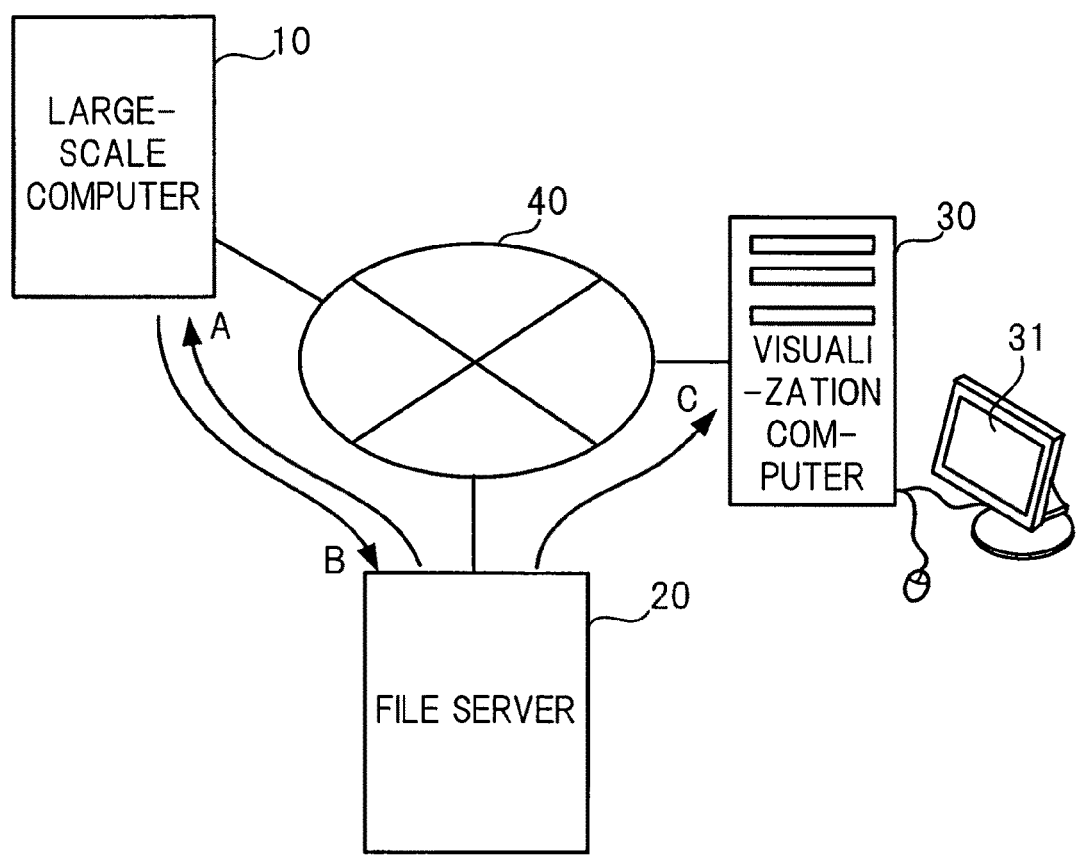
FIG. 1 is a schematic diagram illustrating an example of a system including a large-scale computer according to an embodiment of a vortex extraction apparatus according to the present invention.

FIG. 1 is a schematic diagram illustrating an example of a system including a large-scale computer according to an embodiment of a vortex extraction apparatus according to the present invention.

Here, a large-scale computer 10, a file server 20, a visualization computer 30 are connected together via a communication line network 40 such as the Internet.

The large-scale computer 10 corresponds to an embodiment of the vortex extraction apparatus according to the present invention, and arithmetically processes a large amount of data at a high speed.

The file server 20 is an apparatus in which there are filed: flow velocity data on which vortex extraction calculations carried out by the large-scale computer 10 are based and data indicative of the results of the vortex extraction calculations carried out by the large-scale computer 10.

The visualization computer 30 is an example of a vortex display apparatus and receives data indicative of the results of vortex extraction calculations carried out by the large-scale computer 10 to display the results on a display screen 31. The visualization computer 30 may be a commercially available personal computer (hereinafter referred to as the "PC").

FIG. 1 illustrates only one visualization computer 30. However, this represents all such computers, and multiple or many visualization computers 30 may be provided.

Here, it is assumed that data on the flow velocities measured at multiple points distributed in a fluid space is stored in the file server 20, the data being indicative of the distribution of the flow velocities in the fluid space.

The flow velocity data may be actually measured by carrying out, for example, wind tunnel experiments or may be obtained through simulation performed by a simulation computer (not illustrated). Alternatively, the large-scale computer 10 illustrated in FIG. 1 may also serve as a simulation computer.

The flow velocity data stored in the file server 20 and indicating the flow velocity distribution in the fluid space is input to the large-scale computer 10 (arrow A). The large-scale computer 10 then carries out a vortex extraction calculation. Data indicative of the result of the vortex extraction calculation performed by the large-scale computer 10 is transmitted to the file server 20 again. The data is temporarily stored in the file server 20 (arrow B). Thereafter, the data stored in the file server 20 and indicating the vortex extraction calculation result is transmitted to the visualization computer 30 in response to a request from the visualization computer 30 (arrow C). The visualization computer 30 receives the data indicative of the vortex extraction calculation result and displays vortices based on the data.

In the file server 20, data on the flow velocity distribution, which varies momentarily, is accumulated in a time series manner. The large-scale computer 10 may extract vortices at each point in time. Thus, the visualization computer 30 may display momentary variations in vortices (occurrence, extinction, confluence, branching, and the like). Furthermore, the vortex at a certain point in time may be displayed such that, for example, the vortex is redirected, enlarged, or reduced.

Figure 2:
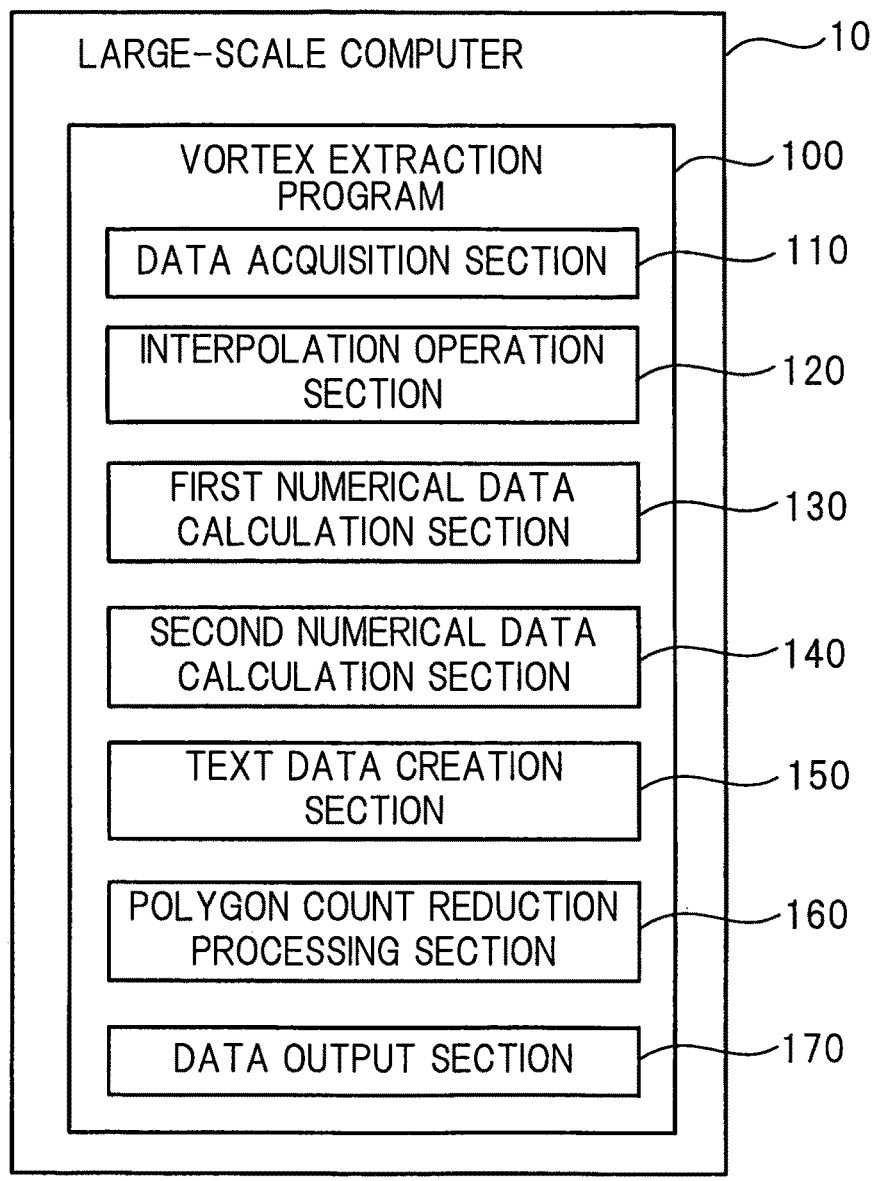
FIG. 2 is a diagram schematically illustrating a vortex extraction program according to an embodiment of the present invention.

FIG. 2 is a diagram schematically illustrating a vortex extraction program according to an embodiment of the present invention.

A vortex extraction program 100 illustrated in FIG. 2 is installed in and executed by the large-scale computer 10. The vortex extraction program 100 allows the large-scale computer 10 to operate as an example of the vortex extraction apparatus according to the present invention. The vortex extraction program 100 includes a data acquisition section 110, an interpolation operation section 120, a first numerical data calculation section 130, a second numerical data calculation section 140, a text data creation section 150, a polygon count reduction processing section 160, and a data output section 170. The sections 110 to 170 are program sections included in the vortex extraction program 100. The operations of the sections 110 to 170 will be described later.

Figure 3:
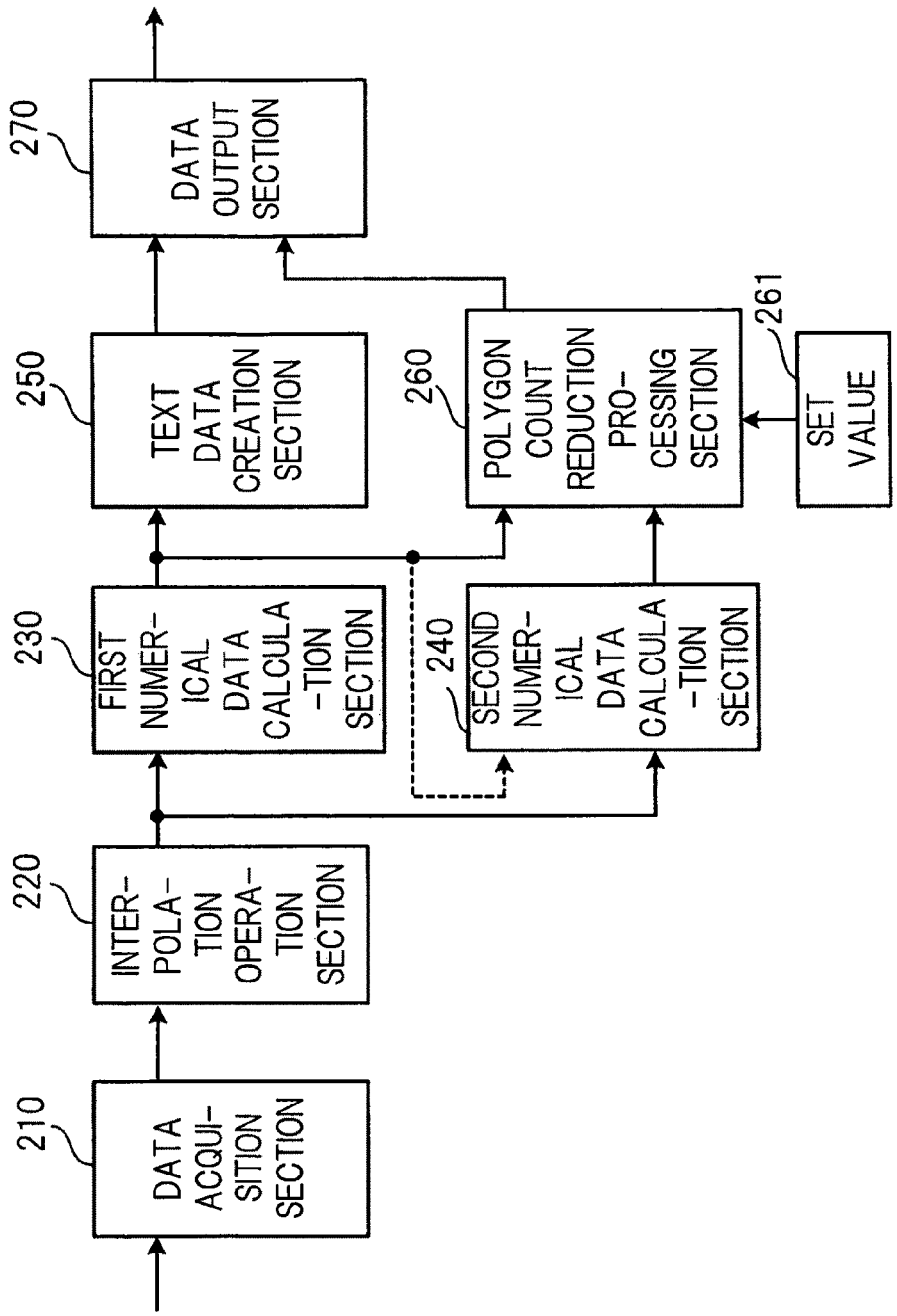
FIG. 3 is a diagram schematically illustrating an embodiment of the vortex extraction apparatus according to the present invention.

FIG. 3 is a diagram schematically illustrating an embodiment of the vortex extraction apparatus according to the present invention.

The vortex extraction apparatus illustrated in FIG. 3 includes a data acquisition section 210, an interpolation operation section 220, a first numerical data calculation section 230, a second numerical data calculation section 240, a text data creation section 250, a polygon count reduction processing section 260, and a data output section 270. The sections 210 to 260 illustrated in FIG. 3 indicate functions implemented in the large-scale computer 10 when the program sections 110 to 170 included in the vortex extraction program 100 illustrated in FIG. 2 and having the same names as those in FIG. 3 are executed in the large-scale computer 10. Although the same names are used in both FIGS. 2 and 3, the sections 110 to 170 in FIG. 2 refer only to software, whereas the sections 210 to 270 in FIG. 3 refer to functions implemented in the large-scale computer 10 by a combination of the program sections illustrated in FIG. 2 and having the same names with hardware, OS (Operating System), and the like. Thus, here, the description of the operations of the sections 210 to 270 in FIG. 3 also serves as the description of the sections 110 to 170 in FIG. 2.

The data acquisition section 210 included in the vortex extraction apparatus 200 illustrated in FIG. 3 provides a function to acquire data on flow velocities measured at multiple points distributed in a fluid space from which vortices are to be extracted, from the file server 20 illustrated in FIG. 1 via the communication line network 40.

Furthermore, the interpolation operation section 220 executes an interpolation operation based on the flow velocity data acquired by the data acquisition section 210 to calculate flow velocity data on each vertex of each of multiple first voxels resulting from division of the fluid space into structured grids.

Additionally, the first numerical data calculation section 230 calculates first numerical data indicating whether each vertex of each of the multiple first voxels into which the inside of the fluid space is split is located inside or outside a fluid vortex region. The first numerical data calculation section 230 calculates the first numerical data based on the flow velocity data acquired by the data acquisition section 210.

Moreover, the second numerical data calculation section 240 calculates second numerical data indicative of the intensity of vortices in each first voxel included in a vortex region determined based on the first numerical data calculated by the first numerical data calculation section 230. The second numerical data calculation section 240 calculates the second numerical data based on the flow velocity data acquired by the data acquisition section 210. The second numerical data calculation section 240 may calculate the second numerical data on each voxel, either only for the inside of the vortex region or for the whole fluid space without determination of whether each vertex of the voxel is located inside or outside the vortex region.

Furthermore, the text data creation section 250 determines the center line of vortices in the fluid based on the flow velocity data acquired by the data acquisition section 210. Additionally, the text data creation section 250 determines the size of the vortex region around the center line based on the first numerical data on each vertex calculated by the first numerical data calculation section 230. Then, the text data calculation section 250 creates text data indicative of the center line and size.

Moreover, the polygon count reduction processing section 260 counts the number of polygons defining the surface of the vortex region, such polygons including isosurfaces of the first numerical data calculated by the first data calculation section 230. Then, the polygon count reduction processing section 260 integrates the multiple first voxels into second voxels into which the fluid space is roughly split until the number of polygons is equal to or smaller than a set value (a "set value" 261 illustrated in FIG. 3). That is, the first numerical data is decimated such that only the first numerical data corresponding to the vertices of the second voxels remains. Based on the second numerical data calculated by the second numerical data calculation section 240, the polygon count reduction processing section 260 further creates second numerical data corresponding to each of the second voxels resulting from the integration. Here, the "set value" 261 may be pre-specified for each visualization computer 30 (see FIG. 1) from the visualization computer 30. Alternatively, the "set value" 261 may be a uniform value set via the large-scale computer 10 regardless of the type of the visualization computer 30 or the like, so as to allow an average PC to carry out a visualization process at a high speed. Alternatively, the "set value" 261 may be contained in the vortex extraction program 100 illustrated in FIG. 2, as a constant.

Moreover, the data output section 270 outputs the text data created by the text data creation section 250. Furthermore, the data output section 270 outputs the first numerical data corresponding to each vertex of each of the second voxels obtained by the polygon count reduction processing section 260. The data output section 270 outputs not only the text data and first numerical data but also the second numerical data corresponding to the second voxels.

As described above, the data output by the vortex extraction apparatus 200 is temporarily stored in the file server 20 and then transmitted to the visualization computer 30. The visualization computer 30 displays vortices on the display screen 31 based on the data.

Figure 4:
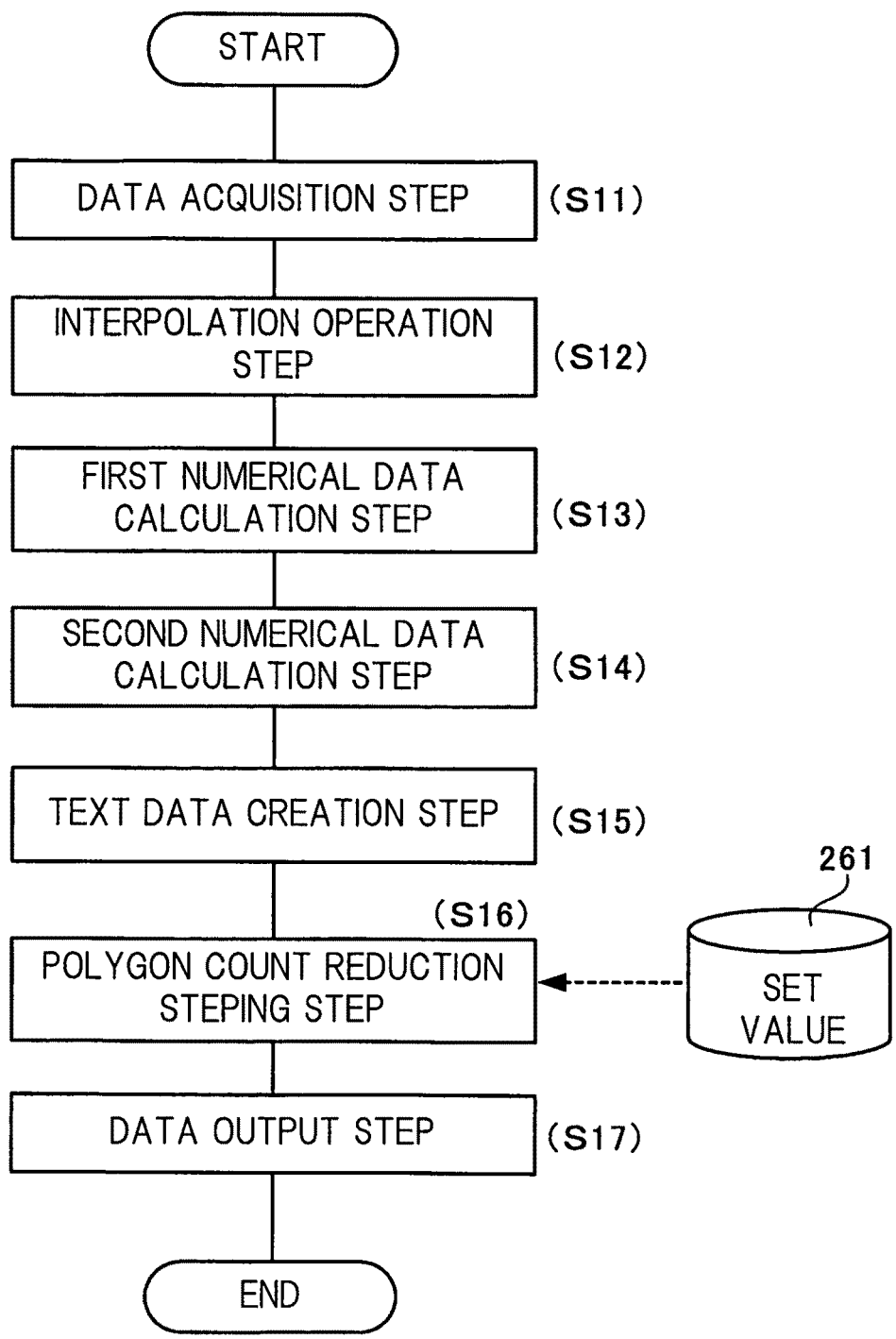
FIG. 4 is a flowchart schematically illustrating an embodiment of a vortex extraction method according to the present invention.

FIG. 4 is a flowchart schematically illustrating an embodiment of a vortex extraction method according to the present invention.

The vortex extraction method illustrated in FIG. 4 is implemented by executing the vortex extraction program 100 illustrated in FIG. 2, in the large-scale computer 10 illustrated in FIG. 1. The vortex extraction method includes a data acquisition step (S11), an interpolation operation step (S12), a first numerical data calculation step (S13), and a second numerical data calculation step (S14). The vortex extraction method further includes a text data creation step (S15), a polygon count reduction processing step (S16), and a data output step (S17).

The execution contents of steps S11 to S17 are the same as the operations of the sections 210 to 270 of the vortex extraction apparatus 200 illustrated in FIG. 3. Here, duplicate descriptions are omitted.

Now, a further detailed embodiment will be described. Also in the embodiment described below, the general configuration of the system in FIG. 1 is used without any change.

Figure 5:
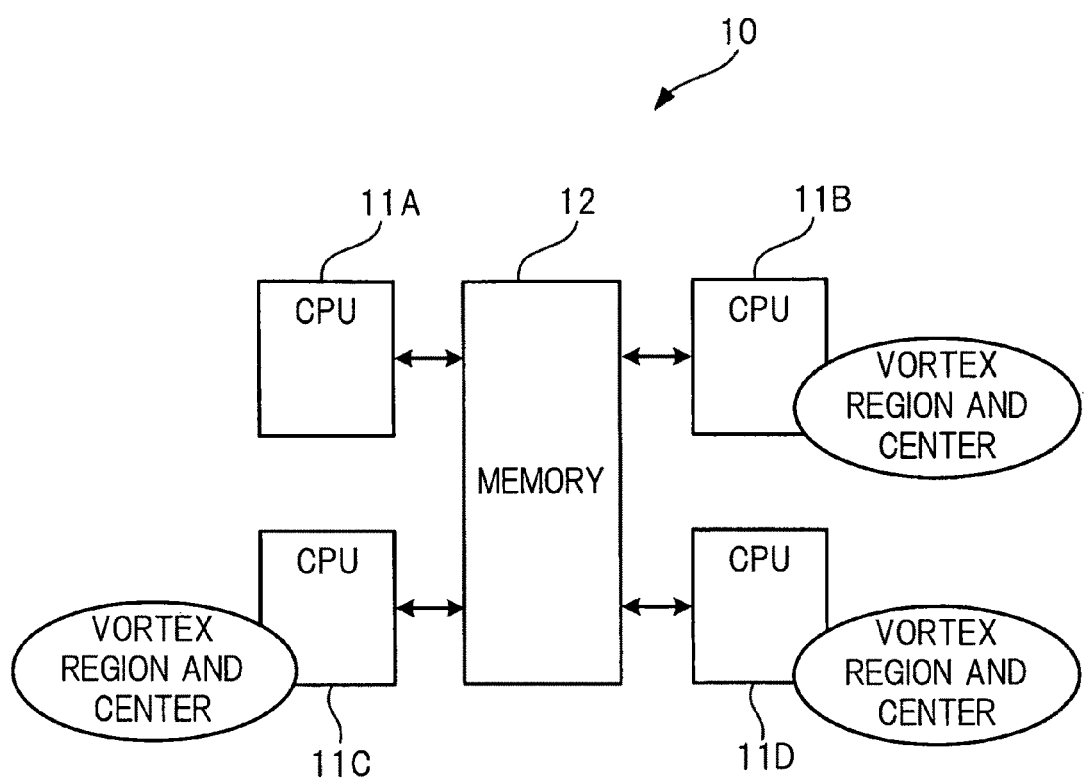
FIG. 5 is a diagram schematically illustrating the internal structure of the large-scale computer.

FIG. 5 is a diagram schematically illustrating the internal configuration of the large-scale computer illustrated in FIG. 1.

The large-scale computer 10 illustrated in FIG. 5 includes multiple (in this case, four) CPUs (Central Processing Units) 11A to 11D that execute programs, and a memory 12 shared by the CPUs 11A to 11D. The multiple CPUs 11A to 11D serve to extract vortices in each of the regions into which the fluid space is split. In this case, the multiple CPUs carry out a vortex extraction process on the respective areas in the fluid space. This enables high-speed arithmetic processing.

Figure 6:
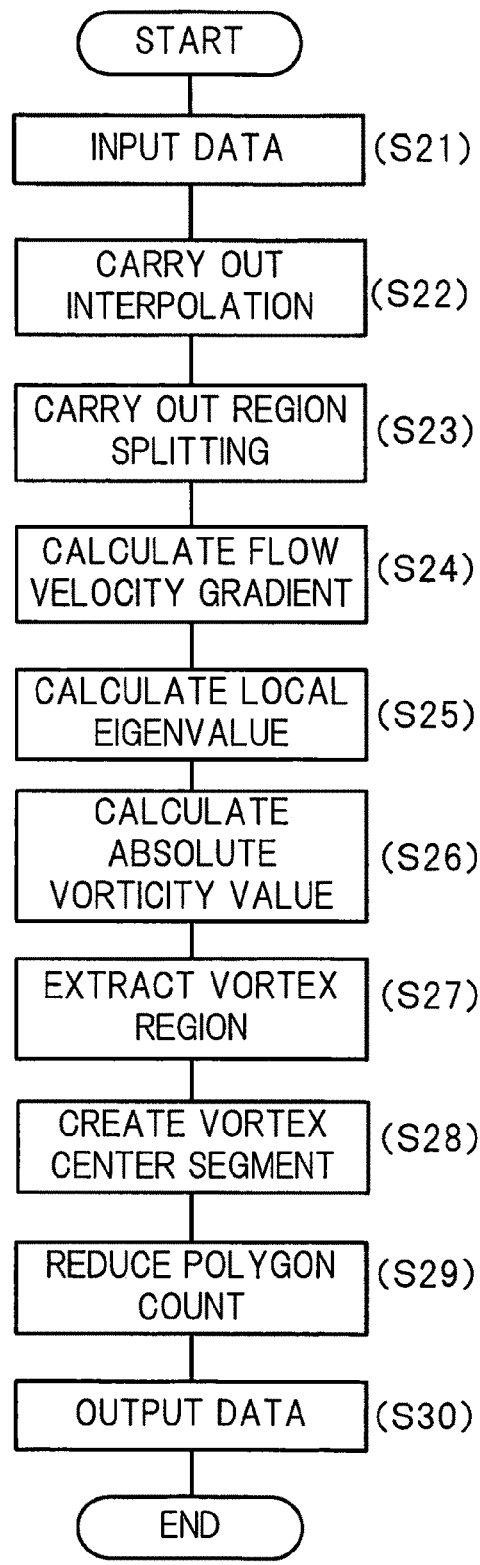
FIG. 6 is a flowchart illustrating steps of the vortex extraction program executed by the large-scale computer.

FIG. 6 is a flowchart illustrating the steps of the vortex extraction program executed by the large-scale computer 10 illustrated in FIGS. 1 and 5.

In this case, processing starting with a data input process (S21) and ending with a data output process (S30) as illustrated in FIG. 6 is executed.

Here, by way of example, the data input process (S21), an interpolation process (S22), a region splitting process (S23), and the data output process (S30) are carried out by the CPU 11A, one of the multiple CPUs 11A to 11D illustrated in FIG. 5. For the other processes (S24 to S29), the other multiple CPUs 11B to 11D execute a calculation for the respective regions into which the fluid space is split. Flow velocity data that is momentarily varying time series data is input to the large-scale computer 10 illustrated in FIGS. 1 and 5. When the CPU 11A finishes the region splitting process (S23) on flow velocity data on a certain point in time, the CPUs 11B to 11D carry out a vortex extraction process on the respective regions for the same point in time. In the meantime, the CPU 11A executes the data input process (S21) and the like on flow velocity data on the next point in time while the CPUs 11B to 11D are carrying out the vortex extraction process on the respective regions. When the CPUs 11B to 11D finish the vortex extraction process (S23 to S29) for a certain point in time, the CPU 11A outputs the results of the extraction process thereof (S30). As described above, in the large-scale computer 10, the multiple CPUs 11A to 11D play the respective rolls to process the respective momentarily varying flow velocity data in parallel.

In the data input process (S21) in the flowchart illustrated in FIG. 6, processing corresponding to the data acquisition section 210 according to the embodiment (represented by the vortex extraction apparatus 200 illustrated in FIG. 3) is executed. That is, in the data input process (S21), the large-scale computer 10 sequentially receives the flow velocity data stored in the file server 20 as time series data and loads the received flow velocity data into the vortex extraction program illustrated in FIG. 6.

Furthermore, in the interpolation process (S22), the large-scale computer 10 carries out processing corresponding to the interpolation operation section 220 of the vortex extraction apparatus 200 illustrated in FIG. 3.

Figure 7:
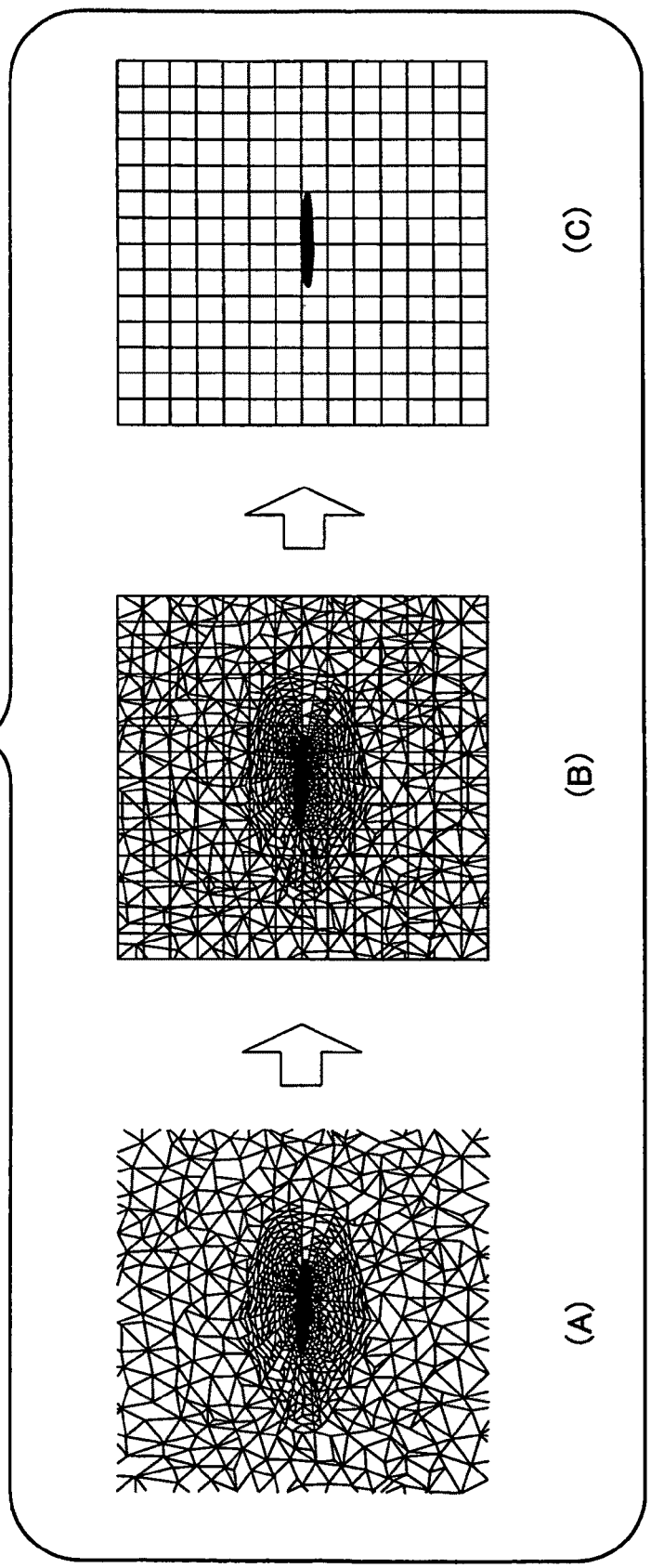
FIG. 7 is a diagram illustrating an interpolation process.

FIG. 7 is a diagram illustrating the interpolation process.

Part (A) of FIG. 7 is a diagram illustrating an example of an unstructured grid obtained before an interpolation process. Part (B) of FIG. 7 is a diagram illustrating the unstructured grid in Part (A) of FIG. 7 on which a structured grid is superimposed. Part (C) of FIG. 7 is a structured grid resulting from the interpolation process. FIGS. 7(A) to 7(C) each illustrate, in the center, a cross section of wings of an airplane obtained when the wings are simulated. The fluid space (in this case, the space around the periphery of the wings) is three-dimensional, but is two-dimensionally illustrated here for simplification.

Part (A) of FIG. 7 illustrates a mosaic pattern including irregular polygons. The polygons included in the mosaic pattern have a larger average area (a larger average side length) toward the periphery of the pattern and have a smaller average area (a smaller average side length) toward the wings, located in the center of the pattern. Each vertex of each of the polygons included in the mosaic pattern is associated with flow velocity data indicative of the flow velocity of a fluid (for example, air) flowing through the fluid space; the flow velocity is measured at the position of each vertex. The flow velocity data is indicative of a flow velocity vector including the three-dimensional flow velocity direction and size of the vortices measured at the associated position.

The flow velocity data is indicative of the flow velocities measured at the multiple points distributed in the fluid space but is inconvenient to handle in this state. Thus, as illustrated in Part (B) of FIG. 7, in which two patterns are superimposed on each other, quadrangular (hexahedral) pixels (voxels) orderly partitioned in two directions, that is, x and y directions (in actuality, three directions, that is, x, y, and z directions) are assumed. Then, an interpolation process is carried out based on the flow velocity data associated with each vertex of each of the irregular polygons illustrated in Part (A) of FIG. 7 to determine the flow velocity data associated with each vertex of each pixel (each voxel). Thus, as illustrated in Part (C) of FIG. 7, flow velocity data is determined on the points arranged at equal intervals in the fluid space. This facilitates the subsequent arithmetic process.

The length (the interval between the flow velocity data in the fluid space) of each side of each pixel (each voxel) is not particularly limited. However, excessively large data intervals may prevent phenomena from being extracted. On the other hand, when the data intervals are excessively small, the calculation takes a long time even with the high throughput of the large-scale computer 10. Furthermore, however small the data intervals are, a resolution equal to or higher than that of the flow velocity of the original unstructured grid (Part (A) of FIG. 7) is obtained. Thus, the size of the pixel (voxel) is preferably determined such that the pixel has an area (volume) equivalent to the average area (in three dimensions, the average volume) of a large number of polygons included in the unstructured grid (Part (A) of FIG. 7). Alternatively, the size of the pixel (voxel) may be determined such that the pixel has a side length equivalent to the average side length of a large number of polygons.

Figure 8:
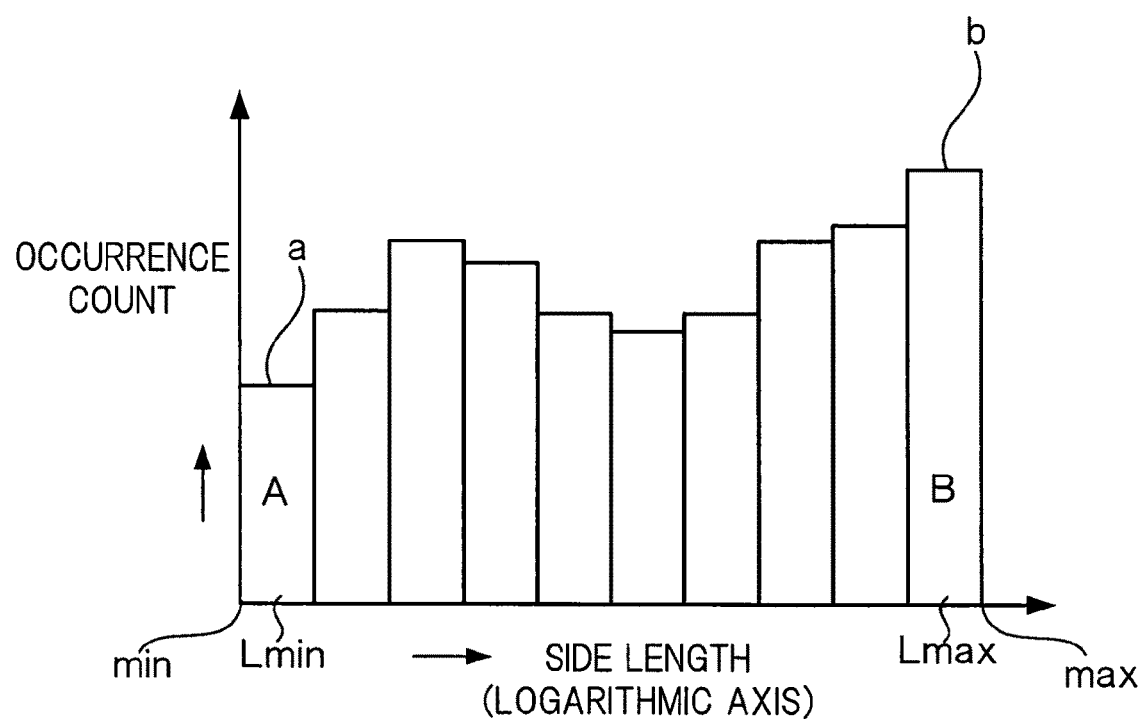
FIG. 8 is a diagram illustrating an example of an algorithm for determining the size of a pixel (voxel)

FIG. 8 is a diagram illustrating an example of an algorithm for determining the size of the pixel (voxel).

The axis of abscissas in FIG. 8 corresponds to ten portions on a logarithmic axis into which the value between the minimum and maximum values min and max of side length of the polygon appearing in the unstructured grid in Part (A) of FIG. 7 is divided. Furthermore, the axis of ordinate in FIG. 8 indicates the number of times a side appears in each portion when the axis of abscissas (side length) is divided into the ten pieces on the logarithmic axis.

The length of each side of each of the polygons included in the unstructured grid illustrated in Part (A) of FIG. 7 is determined. In connection with the number of times each side length appears in the corresponding portion on the axis of abscissas in FIG. 8, the numbers in portions A and B with the minimum and maximum side lengths, respectively, are counted. The number of times the minimum side length appears in the portion A is defined as "a". The number of times the maximum side length appears in the portion B is defined as "b". The representative value of the minimum side length in the portion A is defined as $L_{min}$. The representative value of the maximum side length in the portion B is defined as $L_{max}$. The length of each side of the structured grid (voxel) illustrated in Part (C) of FIG. 7 is defined as L. Then, the length L of each side of the structured grid (voxel) may be calculated in accordance with:

$$L = \frac{a \cdot L\min + b \cdot L\max}{(a+b)} \quad (1)$$

For example, the flow velocity data on each vertex of the voxel with the thus calculated side length L is determined by the interpolation process. However, the way of determining the length L mentioned here is an example, and there may be adopted any of various methods of calculating, for example, the simple average of the side lengths in the unstructured grid and the average length of sides in a sample region in a part of the fluid space. For example, Part (A) of FIG. 7 illustrates the unstructured grid in which the average area is smaller (the average side length is shorter) toward the wings, located in the center. Thus, when the vicinity of the wings is of interest, the average side length of a part of the unstructured grid which is located close to the wings may be determined and then, an interpolation process may be carried out so as to form a structured grid including sides with the determined average length.

The interpolation process itself is a well-known technique and will not be described below. Furthermore, in the above description, the flow velocity data on the unstructured grid is input. However, when the original flow velocity data corresponds to such a structured grid as illustrated in Part (C) of FIG. 7, the interpolation process (S22) is undesired and thus skipped.

When the interpolation process (S22) is finished, the region splitting process (S23) and then a flow velocity gradient calculation process (S24) are carried out. As described above, the data input and interpolation processes (S21) and (S22) in FIG. 6 are executed by the CPU 11A, one of the multiple CPUs 11A to 11D illustrated in FIG. 5. In contrast, the flow velocity gradient calculation process (S24) is shared by the other multiple CPUs 11B to 11D so that the CPUs 11A to 11D carry out the flow velocity gradient calculation process on the respective multiple regions into which the fluid space is split. Thus, here, the region splitting process (S23) is carried out.

Figure 9:
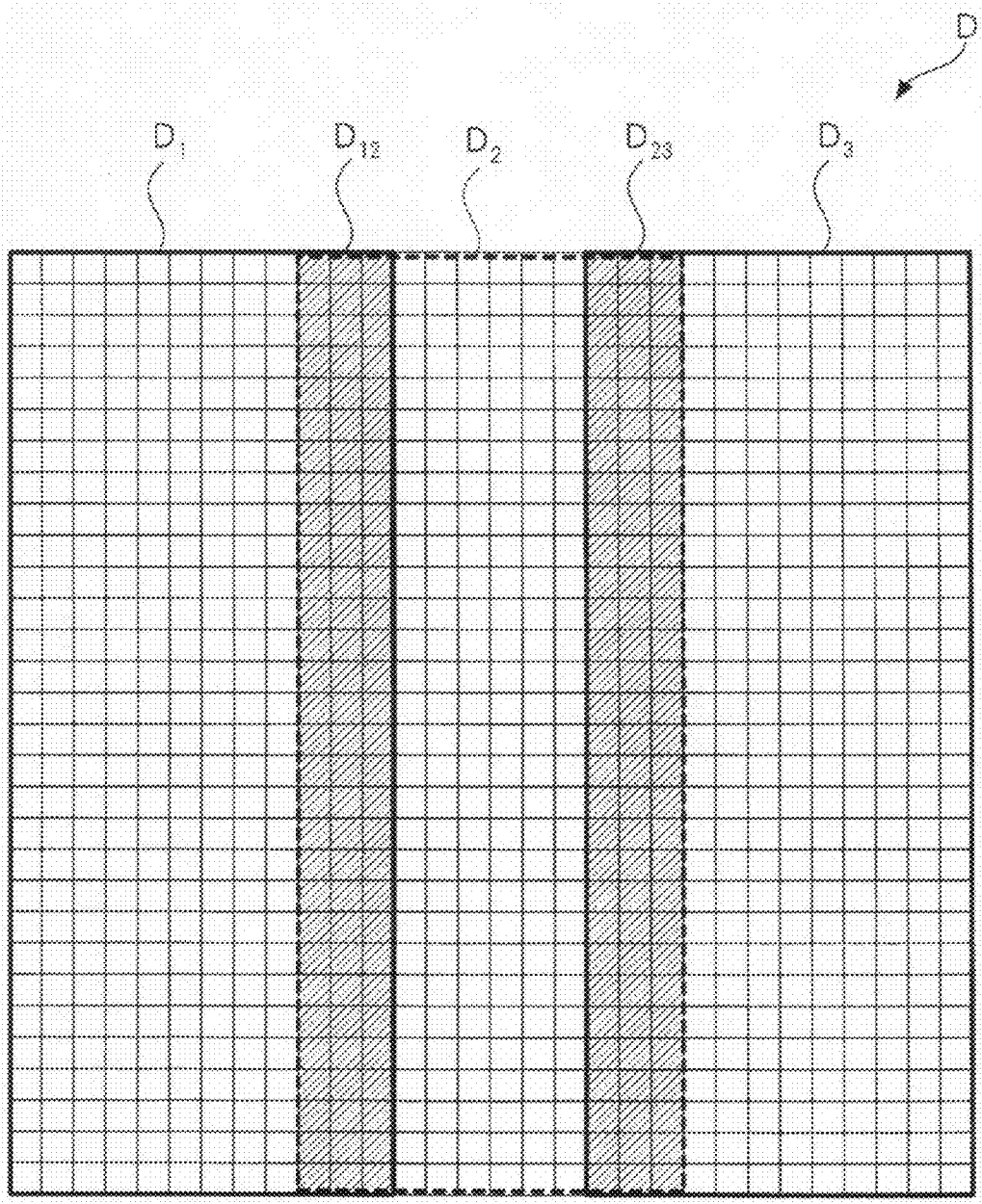
FIG. 9 is a diagram illustrating a region splitting process.

FIG. 9 is a diagram illustrating region splitting. Also in this case, a two-dimensional structured grid is illustrated for simplification.

Here, the fluid space D is split into three overlapping regions D1 to D3. A region D12, one of two shaded regions D12 and D23, is included in both regions D1 and D2. The other region D23 is included in both regions D2 and D3. A region thus included in multiple regions is called a sleeve region.

The multiple (three) CPUs 11B to 11D illustrated in FIG. 5 carries out, on each of the regions D1 to D3, a part of the vortex extraction process which includes the local eigenvalue calculation process (S25) and the subsequent processes in the flowchart in FIG. 6. Here, since the sleeve regions D12 and D23 are set as illustrated in FIG. 9, for the sleeve regions D12 and D23, the multiple CPUs sharing the processing of the regions D1 to D3 including the sleeve regions D12 and D23 provide almost the same processing results. Thus, after the processing, the processing results for all the regions of the fluid space D may be smoothly integrated together.

In the description below, the region resulting from the splitting and the whole fluid space are not distinguished from each other unless otherwise specified.

In the flowchart in FIG. 6, a combination of the flow velocity gradient calculation process (S24), the local eigenvalue calculation process (S25), and a vortex region extraction process (S27) corresponds to the processing in the first numerical data calculation section 230 in FIG. 3. However, the vortex region extraction process (S27) is intended to improve the accuracy of vortex region extraction, and the first numerical data calculation process without the vortex region extraction process (S27) may be sufficient.

In the flow velocity gradient calculation process (S24), the flow velocity gradient of each vertex of each voxel is calculated based on the following Expression (2).

Here, the velocities in the x, y, and z directions in the fluid space are denoted as u, v, and w, respectively. u, v, and w are represented by "q", and x, y, and z are represented by "r". Furthermore, the coordinates of each vertex are representatively denoted as (i, j, k). Moreover, i, j, and k are representatively denoted as "n", and i, j, k, and n may be omitted.

In this case, the flow velocity gradient of the vertex (i, j, k) is expressed by:

$$q_r = \frac{\partial q}{\partial r} = \frac{q_{n+1} - q_{n-1}}{2\Delta r} \quad (2)$$

However, $\Delta r$ denotes the length of each side of each voxel in an r direction.

Here, processing is preferably carried out such that $q_r=0$ on boundaries with quiescent objects such as boundaries with wings illustrated in the center of FIG. 7 and wall surfaces defining the fluid space.

In this case, $q_r$ is expressed by Expression (2) that is a single expression. However, Expression (2) denotes nine elements of a flow velocity matrix J in the following Expression (3).

Once the flow velocity gradient is calculated for each vertex (i, j, k) of each voxel in accordance with Expression (2), the local eigenvalue calculation process (S25) is carried out.

In the local eigenvalue calculation process (S25), a flow velocity matrix J containing, as elements, flow velocity gradients determined in accordance with Expression (2) is given as follows.

$$J = \begin{pmatrix} u_x & u_y & u_z \\ v_x & v_y & v_z \\ w_x & w_y & w_z \end{pmatrix} \quad (3)$$

Furthermore, S and Q are defined by:

$$S = \frac{1}{2}(J + J^T) \quad (4)$$

$$Q = \frac{1}{2}(J - J^T) \quad (5)$$

Here, $J^T$ is a transposed matrix of J. Then, three eigenvalues $\lambda_a$, $\lambda_b$, and $\lambda_c$ for a matrix A expressed as follows are calculated.

$$A = S^2 + Q^2 \quad (6)$$

The calculated three eigenvalues $\lambda_a$, $\lambda_b$, and $\lambda_c$ are arranged in numerical order to be $\lambda_1 < \lambda_2 < \lambda_3$. Each of $\lambda_1$, $\lambda_2$, and $\lambda_3$ is any of $\lambda_a$, $\lambda_b$, and $\lambda_c$.

Here, the eigenvalue $\lambda_2$, corresponding to the median of the three eigenvalues $\lambda_1$, $\lambda_2$, and $\lambda_3$ arranged in numerical order, is extracted. $\lambda_2$ corresponds to an example of the first numerical data calculated by the first numerical data calculation section 230 in FIG. 3.

The eigenvalue $\lambda_2$ is calculated for each vertex (i, j, k) of each voxel. When the eigenvalue $\lambda_2$ calculated for a certain vertex (i, j, k) is $\lambda_2 < 0$, the vertex (i, j, k) is determined to be inside the vortex region. When $\lambda_2 \geq 0$, the vertex (i, j, k) is determined to be outside the vortex region.

This vortex region determination algorithm focuses on the fact that when a broad view of a vortex is taken, the vortex makes two-dimensional motion by revolving around the center line, which extends one-dimensionally. The algorithm itself is well-known and is called a $\lambda_2$ method proposed by Jeong et al (see "On the identification of a vortex" listed above).

Here, when $\lambda_2 < 0$ is calculated for a certain vertex (i, j, k), $\lambda_2$ is associated with the vertex (i, j, k) with the value unchanged. On the other hand, when $\lambda_2$ is calculated to be $\lambda_2 \geq 0$, $\lambda_2$ is substituted with $\lambda_2 = 0$, which is then associated with the vertex.

Thus, the vortex region is roughly extracted such that a region with $\lambda_2 < 0$ is determined to be a vortex region, whereas a region with $\lambda_2 = 0$ is located outside the vortex.

Then, an absolute vorticity value calculation process (S26) is carried out. In the absolute vorticity value calculation process (S26), an absolute value $|\omega|$ of a vorticity $\omega$ is calculated.

The absolute vorticity value calculation process (S26) corresponds to the processing carried out by the second numerical data calculation section 240 in FIG. 3.

Here, the vorticity ω is calculated for each voxel.

When the flow velocity vector of a certain voxel is defined as U, the vorticity ω is given as follows.

$$\omega = \nabla \times U \quad (7)$$

Here, $\nabla$ is an operator expressed as follows.

$$\nabla = \left(\frac{\partial}{\partial x}, \frac{\partial}{\partial y}, \frac{\partial}{\partial z}\right)$$

Here, x denotes an outer product (vector product). The use of Expression (8) results in Expression (9).

$$U = (u^c, v^c, w^c) \quad (8)$$

$$\omega = \nabla \times U \quad (9)$$
$$= \left(\frac{\partial w^c}{\partial y} - \frac{\partial v^c}{\partial z}, \frac{\partial u^c}{\partial z} - \frac{\partial w^c}{\partial x}, \frac{\partial v^c}{\partial x} - \frac{\partial u^c}{\partial y}\right)$$

Here, U denotes the representative flow velocity vector of the voxels, and the flow velocity data is related to each vertex of each voxel. As one technique, it is conceivable to calculate flow velocity data on the center of the voxel by the interpolation process based on the flow velocity data on each vertex and to define the calculated flow velocity data as U so that the calculation in Expression (9) is carried out. However, here, ω is calculated as follows without separating the interpolation operation from the calculation of ω based on Expression (9). Here, for easy understanding, the description will be provided based on two dimensions.

Expression (9) is rewritten for the two dimensions as follows.

$$\omega = \nabla \times U \quad (10)$$
$$= \frac{\partial v^c}{\partial x} - \frac{\partial u^c}{\partial y}$$

Figure 10:
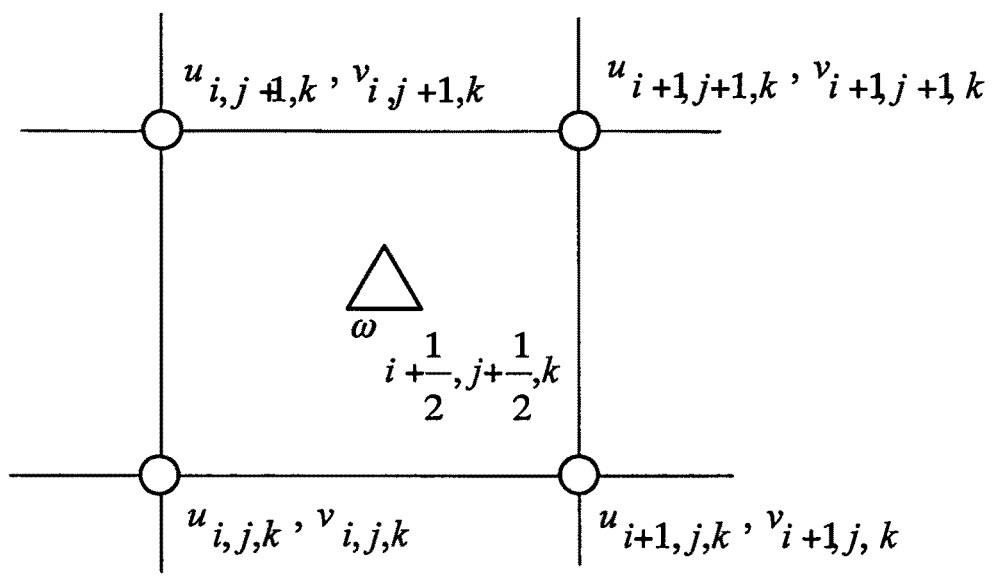
FIG. 10 is a diagram illustrating a vorticity calculation method.

FIG. 10 is a diagram illustrating a method for calculating the vorticity ω. Here, an x-y two-dimensional plane is assumed for simplification.

The velocities of each of the vertices (i, j, k), (i+1, j, k), (i, j+1, k), and (i+1, j+1, k) of a certain voxel (corresponding to a certain pixel herein because the two dimensions are assumed) in the x and y directions are expressed as u and v with the coordinates of the vertex (for example, i, j, and k) as illustrated in FIG. 10.

In this case, in accordance with Expression (10), the vorticity of a central point in the pixel is expressed as follows.

$$\omega_{i+\frac{1}{2}, j+\frac{1}{2}, k}$$

Then, the following expression is given.

$$\omega_{i+\frac{1}{2}, j+\frac{1}{2}, k} = \frac{1}{2}\left[\frac{v_{i+1,j+1} - v_{i,j+1}}{\Delta x} + \frac{v_{i+1,j} - v_{i,j}}{\Delta x}\right] + \quad (11)$$
$$\frac{1}{2}\left[\frac{u_{i+1,j+1} - u_{i+1,j}}{\Delta y} + \frac{u_{i,j+1} - u_{i,j}}{\Delta y}\right]$$

In actuality, a three-dimensional calculation in accordance with Expression (9) is executed instead of a two-dimensional calculation in accordance with Expressions (10) and (11). Thus, the vorticity ω of each voxel is calculated to determine the intensity of the vortices expressed as the absolute value |ω| thereof. The intensity |ω| of the vortices corresponds to an example of the second numerical data calculated by the second numerical data calculation section 240 in FIG. 3.

Then, in the present embodiment, the vortex region extraction process (S27) in the flowchart in FIG. 6 allows, if desired, modification of the eigenvalue $\lambda_2$ temporarily determined in the local eigenvalue calculation process (S25) and indicating whether the vertex is located inside ($\lambda_2 < 0$) or outside ($\lambda_2 = 0$) the vortex region.

Figure 11:
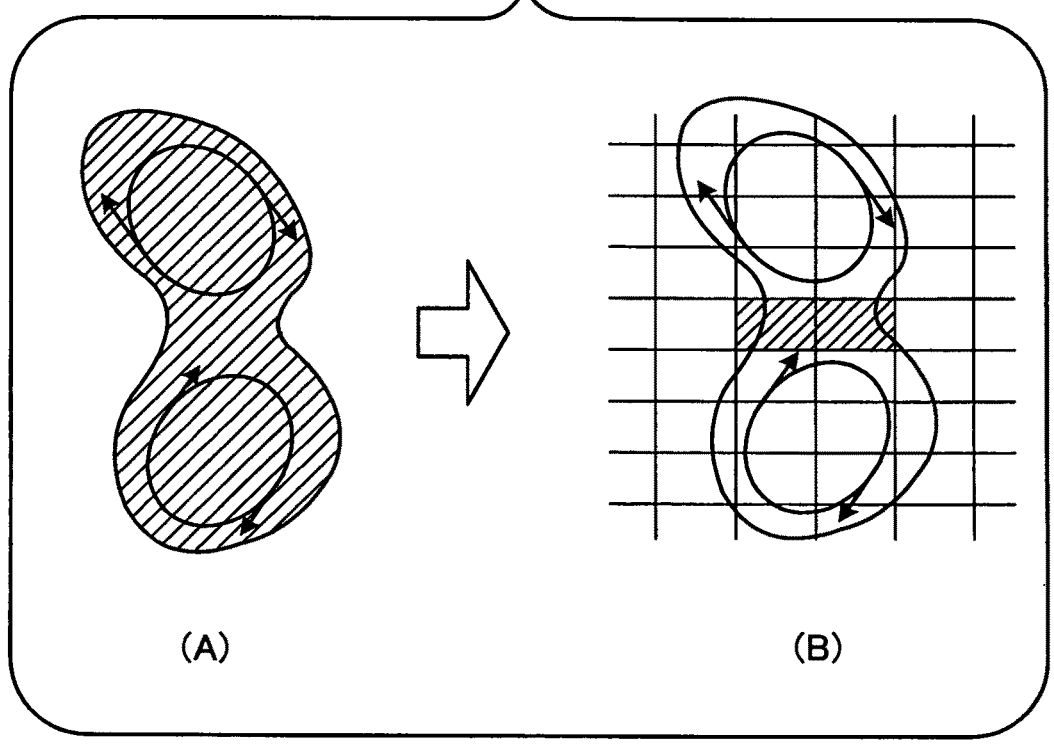
FIG. 11 is a diagram illustrating a vortex region extraction process.

FIG. 11 is a diagram illustrating the vortex region extraction process.

Part (A) of FIG. 11 is a diagram schematically illustrating a region with $\lambda_2 < 0$. Part (B) of FIG. 11 is a diagram illustrating separation of the vortex region based on the value of |ω|. Also in this case, a two-dimensional plane is assumed for simplification.

In Part (A) of FIG. 11, it is assumed that the shaded region corresponds to the region with $\lambda_2 < 0$ (inside the vortex region). The condition of vortices is unknown at this stage, but it is assumed that the illustrated two vortices are present. Here, for the inside of a region with an eigenvalue $\lambda_2$ calculated in the local eigenvalue calculation process (S25) to be smaller than zero, the absolute vorticity value determined in the absolute vorticity value calculation process (S26), that is, the vortex intensity |ω|, is checked. Then, |ω| is compared with a certain threshold. $\lambda_2$ of voxels with |ω| equal to or smaller than the threshold is replaced with $\lambda_2 = 0$. For example, here, it is assumed that the voxel in the shaded region in Part (B) of FIG. 11 has |ω| equal to or smaller than the threshold. As described above, the vortex region temporarily extracted using $\lambda_2$ is separated using |ω| if desired. This allows the vortex region to be more accurately extracted.

After the vortex region is extracted as described above, a process of creating a segment representing the vortex center (S28) in FIG. 6 is carried out. The process of creating a segment representing the vortex center (S28) corresponds to the processing carried out by the text data creation section 250 in FIG. 3.

Figure 12:
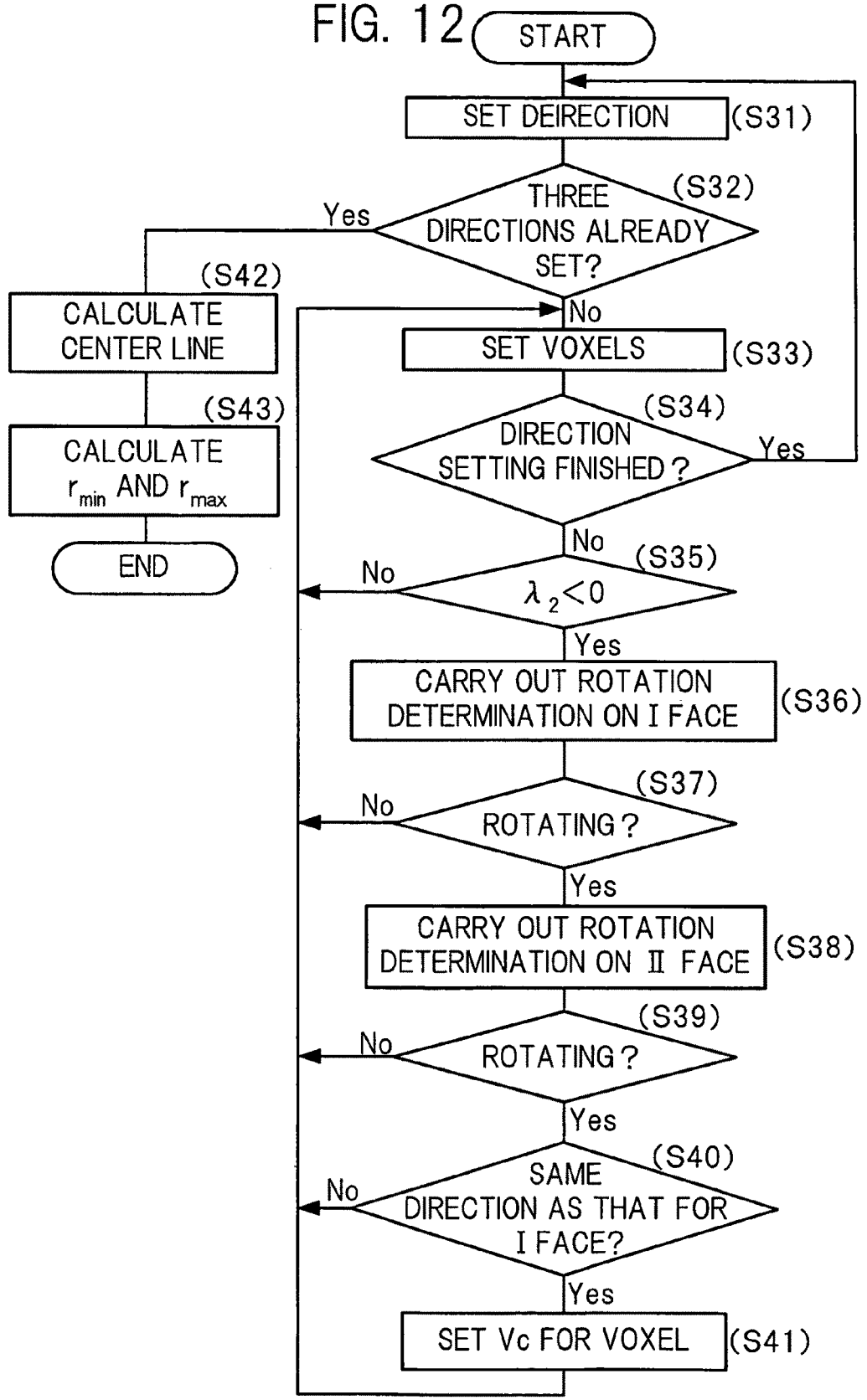
FIG. 12 is a flowchart illustrating the detailed flow of a vortex center segment creation process (S28) in FIG. 6.

FIG. 12 is a flowchart illustrating the detailed flow of the process of creating a segment representing the vortex center (S28). Furthermore, FIG. 13 is a schematic diagram of a voxel.

Figure 13:
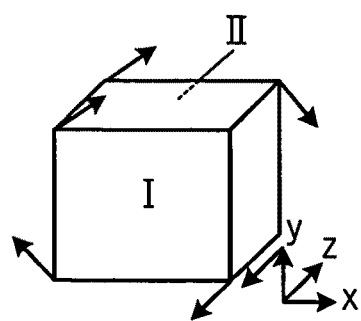
FIG. 13 is a schematic diagram of a voxel.

As illustrated in FIG. 13, each vertex of the voxel is associated with flow velocity data expressed by such a vector as illustrated by an arrow in FIG. 13. Here, the flow velocity data on one vertex is representatively expressed as (u, v, w) ("u" denotes the flow velocity in the x direction, "v" denotes the flow velocity in the y direction, and "w" denotes the flow velocity in the z direction).

In the process of creating a segment representing the vortex center as illustrated in FIG. 12, processing described below is carried out on two surfaces (I and II surfaces) directed in the z direction, two surfaces directed in the y direction, and two surfaces directed in the x direction in this order. Here, the two surfaces (I and II surfaces) directed in the z direction will be described. The same processing is executed on the two surfaces directed in each of the y and x directions except for the direction.

First, for the I surface, one of the two surfaces (I and II surfaces) directed in the z direction, the flow velocity vectors of the four vertices corresponding to the four corners of the I surface are mapped to the I surface and processed. In other words, the program neglects a z direction component (w), one of the flow velocity vectors (u, v, w) of the four vertices. The program determines whether or not the fluid is rotating, based on the x and y components (u, v). A criterion for determination of whether or not the fluid is rotating will be described later. Upon determining that the fluid is rotating on the I surface, the program carries out similar determination on the II surface, the other surface directed in the same z direction. That is, the program neglects a (z) component 2, one of the flow velocity vectors (u, v, w) of the four vertices corresponding to the four corners of the II surface. The program determines whether or not the fluid is rotating in the same direction as the rotation direction on the I surface, based on the x and y components (u, v). Moreover, the program determines whether or not outward and inward flux conditions are the same for the I surface and for the II surface. Upon determining that rotation is occurring in the same direction as that for the I surface and for the II surface and that the outward and inward flux conditions are the same for the I surface and for the II surface, the program assigns a positive constant Vc to the voxel. The constant Vc indicates that the voxel is located on the vortex center axis. The same processing is carried out on voxels in the fluid space for which at least one vertex has $\lambda_2<0$ (this is indicative of the inside of the vortex region). Moreover, the same processing is carried out on the two surfaces directed in the y direction. The same processing is carried out on the two surfaces directed in the x direction.

FIG. 12 is a flowchart basically illustrating the above-described processing. The contents of the processing will be described below in accordance with the flowchart.

In step S31, on which of the z, y, and x directions processing is to be carried out is determined. The above-described processing is executed on the z direction.

In step S32, whether or not the processing has been carried out on all of the three directions, namely the z, y, and x directions, is determined. When the processing has been carried out on all of the three directions, namely the z, y, and x directions, the program proceeds to step S42. The processing in step S42 will be described later. In the following description, it is assumed that the z direction is set in step S31. In step S33, one of the unprocessed voxels is set to be the next processing target. In step S34, the program determines whether or not all the voxels have been processed with respect to the direction (here, the z direction) set in step S31. In step S34, upon determining that all the voxels have been processed with respect to the currently set direction (here, the z direction) set in step S31, the program returns to step S31 to set the next direction (for example, the y direction follows the z direction). When an unprocessed voxel is set in step S33, the program proceeds to step S35 via step S34. In step S35, the program determines whether or not at least one of the eight vertices of the voxel set in step S33 meets $\lambda_2<0$. When the eight vertices all have $\lambda2=0$ (as described above, $\lambda_2 \geqq 0$ has been replaced with $\lambda_2=0$), the voxel is located outside the vortex region. Thus, the processing is undesired for the voxel. The program returns to step S33 to set the next voxel.

Upon determining, in step S35, that at least one of the eight vertices has $\lambda_2<0$, the program proceeds to step S36 to determine whether or not for the I surface, one of the two surfaces (I and II surfaces) directed in the current set direction (here, the z direction), the fluid is rotating. In the determination, as described above, the flow velocity components, in the currently set direction (here, the z direction), of the flow velocity vectors of the four vertices corresponding to the four corners of the I surface are neglected, with the flow velocity components in the remaining two directions taken into account. The determination criterion for rotation will be described further later.

Upon determining that rotation is not occurring on the I surface, the program suspends the processing executed on that direction (here, the z direction) of the voxel, and returns to step S33 (step S37). Upon determining that rotation is occurring on the I surface, the program then carries out similar determination on the other surface (II surface) directed in the same direction (here, the z direction) (step S38). Upon determining that rotation is not occurring on the II surface (step S39) and upon determining that rotation is occurring on the II surface but that the rotation is not in the same direction as that on the I surface (the same direction also for the outward and inward fluxes described later) (step S40), the program returns to step S33. Upon determining that the rotation on the II surface is in the same direction as that of the rotation on the I surface (the same direction also for the outward and inward fluxes described), the program proceeds to step S41. Then, the program sets, for the current processing target voxel, a value Vc indicating that the voxel is located on the center axis. The program then returns to step S33. In step S33, the next one of the unprocessed voxels is set to be the next processing target with respect to the direction corresponding to the current processing (here, the z direction).

When the above-described processing has been carried out on all of the three directions, the z, y, and x directions, the program proceeds to step S42. In step S42, in the voxels for which the value Vc, indicating that the voxel is located on the center axis, is set, a spline function is applied to a group of almost one-dimensionally arranged voxels to calculate the vortex center line. The condition for the group of almost one-dimensionally arranged voxels is used because besides the one-dimensionally arranged voxels, another secondary center line may be present away from the voxels. When the vortex center line is determined, the program then proceeds to step S43. Here, when a plane is assumed which crosses the center line at a right angle at a longitudinally central point on the center line, the minimum and maximum distances $r_{min}$ and $r_{max}$ from the center line (the intersection between the center line and the plane) to the surface of the vortex region (region with $\lambda_2<0$) on the plane are determined. Then, a region generally representing the vortex region is determined based on the minimum and maximum distances $r_{min}$ and $r_{max}$. A segment is then created which corresponds to extension of the region along the center line and which represents the vortex center.

In the process of creating a segment representing the vortex center as illustrated in FIG. 6 (S28), data on the segment is created which is based on the vortex center line and vortex region determined as described above and which represents the vortex center. The data on the segment representing the vortex center includes a function indicative of the center line and data including $r_{min}$ and $r_{max}$ and indicating the vortex region. The data is created as text data unassociated with the individual polygons.

Now, the process of determining whether or not rotation is occurring in steps S36 and S38 in FIG. 12 will be described.

Figure 14:
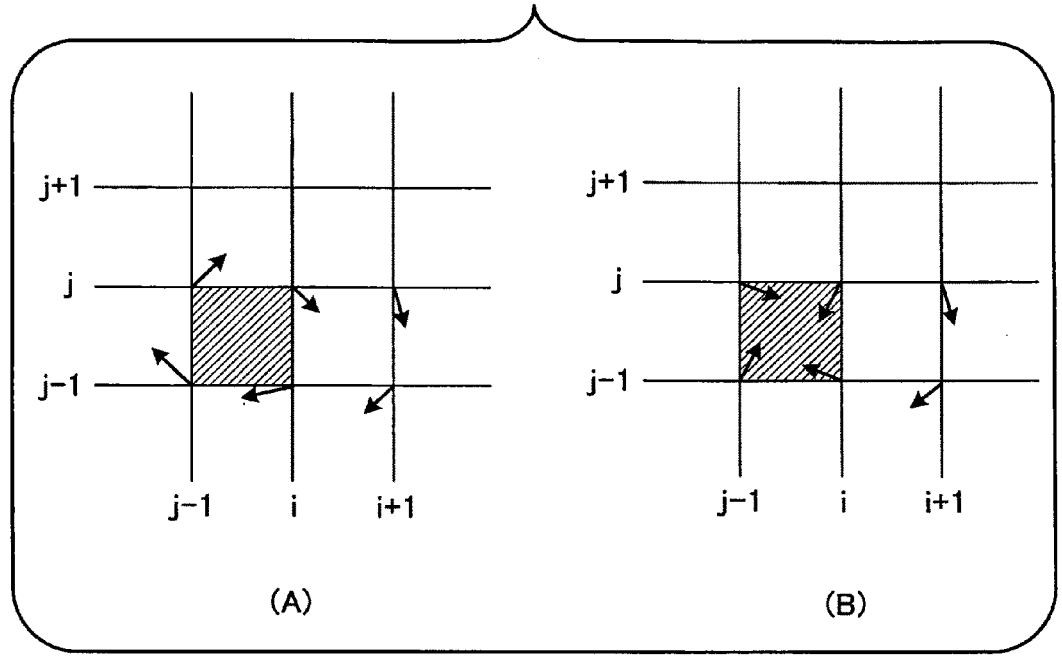
FIG. 14 is a diagram illustrating a rotation determination algorithm.

FIG. 14 is a diagram illustrating a rotation determination algorithm. Also in this case, for simplification, each voxel is illustrated as a pixel mapped onto a two-dimensional plane.

In both Part (A) and Part (B) of FIG. 14, a fluid is determined to be rotating in a shaded voxel and not to be rotating in a voxel on the immediate right of the shaded voxel. In Part (A) of FIG. 14, the flow velocity vectors of the four corners of the shaded pixel are directed in the same rotating direction (here, clockwise rotating direction) outside and along each side of the pixel with an angle of at most 90° to the side. In this case, the central point of an outward flux of a vortex is present in the pixel.

Furthermore, in Part (B) of FIG. 14, the flow velocity vectors of the four corners of the shaded pixel are directed inward of each side and in the same rotating direction along each side with an angle of at most 90° to the side. In this case, the central point of an inward flux of a vortex is present in the pixel.

In FIGS. 14(A) and 14(B), the pixel on the immediate right of the shaded pixel fails to meet both the outward and inward flux conditions described above.

Here, only one of the I and II surfaces directed in the same direction (for example, the z direction) has been described. However, if both outward and inward fluxes are rotating in the same direction in the same manner on both the I and II surfaces directed in the same direction, then for the pixel (voxel), the value Vc indicating that the voxel is located on the center line of the vortex is set.

However, the rotation determination algorithm described with reference to FIGS. 14(A) and 14(B) infrequently fails to determine the voxel actually located on the center line to be located on the center line. However, here, no problem occurs because the center line is specified through application of the spline function. That is, the spline function works continuously even though the value Vc infrequently fails to be set for the voxel on the center line.

However, the determination accuracy for the voxel on the center line may be increased by adding a determination algorithm described below to the determination algorithm described with reference to FIGS. 14(A) and 14(B).

Figure 15:
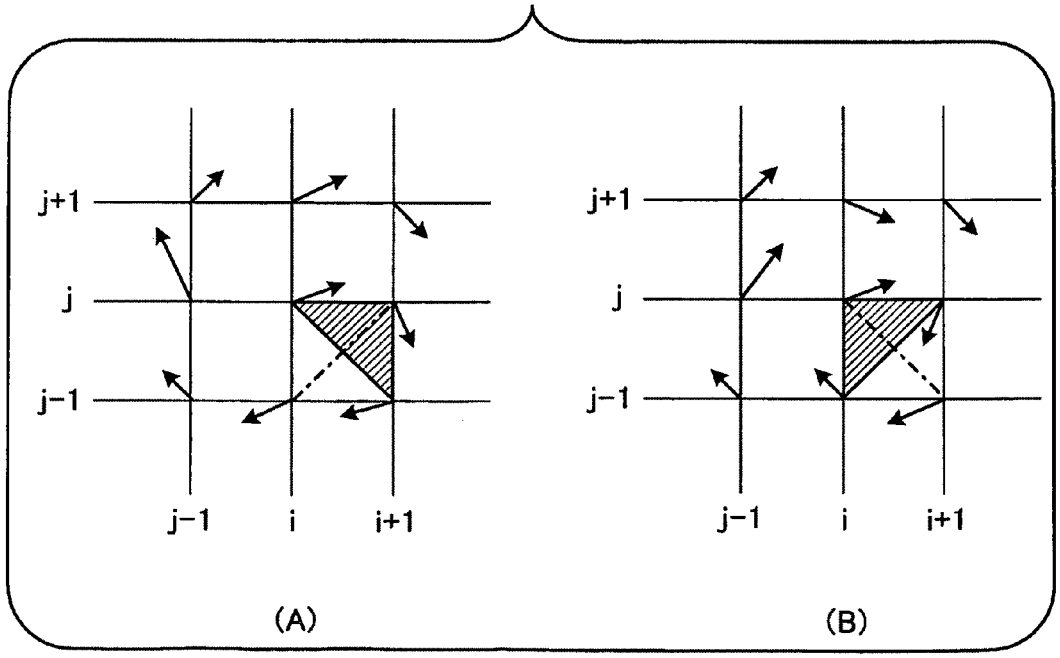
FIG. 15 is a diagram illustrating an additive rotation determination algorithm.

FIG. 15 is a diagram illustrating an additive rotation determination algorithm.

In both Part (A) and Part (B) of FIG. 15, the fluid is determined to be rotating in the lower right pixel (voxel). However, Part (A) and Part (B) of FIG. 15 illustrate only one of the I and II surfaces, and both the I and II surfaces preferably meet the rotation conditions as described above.

The lower right quadrangular pixels in both Part (A) and Part (B) of FIG. 15 fail to meet the rotation determination conditions in both Part (A) and Part (B) of FIG. 14. Thus, the opposing corners of the pixel are connected together with lines to form triangles. Paired opposing corners are connected together with a line to form two triangles. Other paired opposing corners are connected together to form two other triangles. The same determination criteria as those described with reference to FIG. 14 are applied to each of the four triangles. In other words, when the shaded triangles in Part (A) and Part (B) of FIG. 15 are noted, the flow velocity vectors of the three vertices of each of the triangles are directed in the same rotating direction along the respective sides with an angle of at most 90° to the sides. Furthermore, the conditions for the outward and inward fluxes (both Part (A) and Part (B) of FIG. 15 illustrate an outward flux) are met. The value Vc is also set for voxels in which such triangles are present. The determination accuracy for the voxel on the center line of the vortex may be increased by adding the determination algorithm in FIG. 15 to the determination algorithm in FIG. 14.

Now, a polygon count reduction process (S29) in the flowchart in FIG. 6 will be described.

Figure 16:
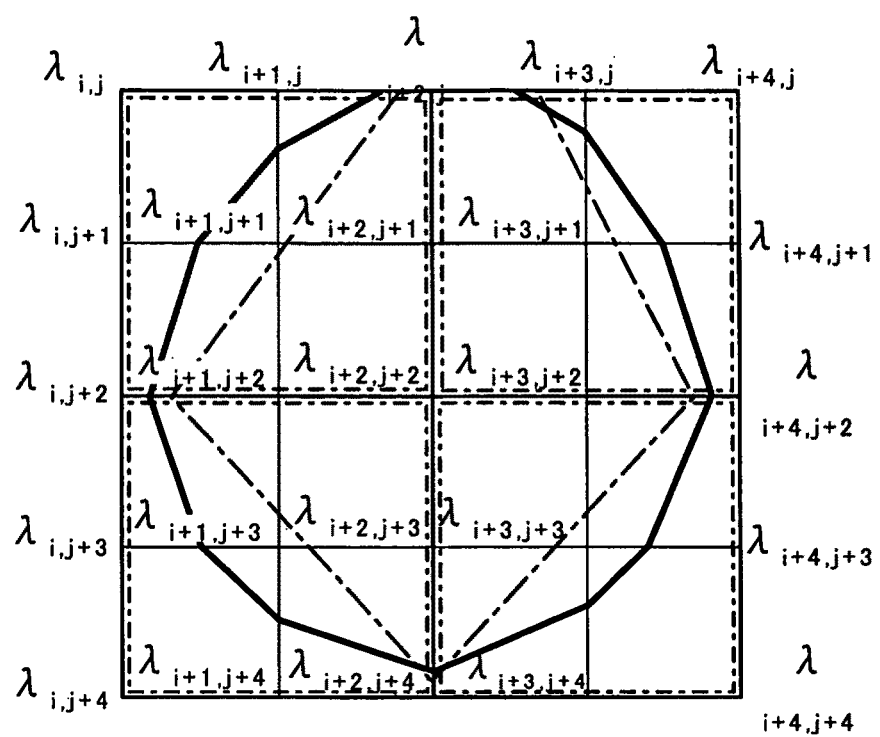
FIG. 16 is a diagram illustrating a polygon count reduction process.

FIG. 16 is a diagram illustrating the polygon count reduction process. Also in this case, for simplification, polygons are illustrated as two-dimensional pixels. Furthermore, here, also for simplification, only 4×4 polygons (pixels), namely, a total of 16 polygons, are illustrated.

Each vertex of each polygon (pixel) is associated with $\lambda_2$. Here, the subscript 2 of $\lambda_2$ is omitted, and i, j, and the like which are indicative of coordinates are illustrated as subscripts. However, the representative of all the values $\lambda_2$ of the coordinates carries the subscript 2 and is illustrated as $\lambda_2$. As described above, each $\lambda_2$ is either $\lambda_2<0$ or $\lambda_2=0$. Here, a negative number with a small absolute value, for example, −0.1, is set, and a Marching Cube method is applied. Thus, polygons each formed of an isosurface with $\lambda_2=-0.1$ are generated. The polygons are expressed as segments on FIG. 16. The Marching Cube method itself is a well-known technique described in "Marching cubes: A high resolution 3D surface construction algorithm" listed above. The polygons each formed of an isosurface with $\lambda_2=-0.1$ define the surface of the vortex region. In FIG. 16, oblique solid lines correspond to the respective polygons. In a fluid space in which three-dimensional voxels are arranged, each polygon forms a triangle.

The number of the polygons thus generated is counted. Here, as described with reference to FIG. 5, the multiple CPUs 11B to 11D share the region to perform the processing (see FIG. 9). Thus, here, the CPU 11A receives reports of the polygon counts in the regions D1 to D3, from the CPUs 11B to 11D, assigned to the regions D1 to D3, respectively. The CPU 11A aggregates the polygon counts so as to avoid doubly counting the polygon counts in the sleeve regions D12 and D23. If the aggregate polygon count exceeds a set value, the CPU 11A instructs the CPUs 11B to 11D to roughly split the fluid space and integrate resultant new voxels with the above-described voxels until the polygon count is equal to or smaller than the set value. Specifically, the 4×4 voxels illustrated in FIG. 16 are integrated with adjacent 2×2 voxels to obtain new voxels indicated by an alternate long and short dash line in FIG. 16. The integration with the new voxels means that the resolution is reduced by removing the values $\lambda_2$ of the points other than the vertices of the new voxels, with only the values $\lambda_2$ of the vertices of the new voxels left. For the new voxels thus created, isosurfaces (polygons) with $\lambda_2=-0.1$ are created and the numbers of the polygons are aggregated, as described above. The numbers of the original voxels arranged in the x, y, and z directions are defined as m, n, and o, respectively. Then, with the numbers of the voxels sequentially reduced to, for example, m/2, n/2, and o/2; m/3, n/3, and o/3; . . . , that is, with the resolution gradually reduced, polygons are repeatedly created until the aggregate number of polygons is equal to or smaller than the set value.

Here, the set value means the number (for example, 1,000, 000) of polygons that may be processed by the visualization computer 30 illustrated in FIG. 1, at an operation speed sufficient for visualization of the vortex. The set value may be pre-specified by the visualization computer 30 or may be a uniformly set value at which a standard PC preferably used as a visualization computer may process the polygons at a sufficient operation speed.

Once the polygon count becomes equal to or smaller than the set value, the intensity |ω| of the vorticity is set for each of the voxels leading to the polygon count. The intensity |ω| of the vorticity has been determined for each of the original, non-integrated voxels (step S26 in FIG. 6). For each of the integrated voxels, a representative value is set, such as the average value or median of the vorticity intensities |ω| of the multiple original voxels contained in the integrated voxel.

Such a polygon count reduction process (step S29 in FIG. 6) reduces the resolution for $\lambda_2$ and $|\omega|$ in the fluid space but enables the visualization computer 30 to provide smooth display. This allows temporal variations in vortices (occurrence, extinction, branching, confluence, and the like) to be easily observed, and improves responsiveness to rotation used to allow the vortices to be viewed at a different angle and other operations such as enlargement, reduction, and movement of the vortices. Furthermore, the display resolution decreases from the display resolution obtained during the vortex extraction operation. However, the process of creating text data indicative of the vortex center line and region is carried out before the resolution is reduced. Thus, such important transition phenomena as hindered from appearing by reducing the resolution may be appropriately sensed.

In the data output process (S30) in FIG. 6, processing corresponding to the data output section 270 in FIG. 3 is carried out. That is, here, the text data indicative of the segment representing the vortex center and created in the process of creating the segment (S28) is output. Moreover, in the data output process (S30), the following data is also output: $\lambda_2$ associated with each vertex of each of the new voxels resulting from the integration in the polygon count reduction process (S29) and $|\omega|$ associated with each of the new voxels resulting from the integration. Furthermore, the positional coordinates of the voxels located on the vortex center line (voxels associated with the value $V_c$) may be output. However, in the present embodiment, data indicative of polygons created during the execution of the polygon count reduction process (S29) is not output. This is because data indicative of polygons is large in amount and is disadvantageous in terms of communication time and memory capacity for storage and because polygons may be created by the visualization computer 30 at a sufficient operation speed if desired.

The data thus output by the large-scale computer 10 illustrated in FIG. 1 is temporarily stored in the file server 20. The data is then transmitted to the visualization computer 30 in response to a request from the visualization computer 30. Based on the received data, the visualization computer 30 displays, on the display screen 31, the segment representing the vortex center based on the text data and vortices themselves based on the voxel data.

Although the display mode of the visualization computer 30 is not particularly limited, typical display modes of the visualization computer 30 will be described below.

The minimum display includes the display of the segment representing the vortex center, based on the text data indicative of the segment. The minimum display allows the occurrence, extinction, confluence, branching, movement, and the like of vortices to be viewed.

Detailed display includes the display of the surface shape of the vortices on the display screen 31 based on polygon data created by the visualization computer 30 using the Marching Cube method.

Then, the detailed shape of the vortices, which is unclear from the display, based on the text data, of the segment representing the vortex center, may be determined.

Furthermore, in addition to the display of the surface shape of the vertices based on polygons, the display of $|\omega|$ associated with the voxel containing the surface polygons may be provided in a color corresponding to the magnitude of the value $|\omega|$. For example, $|\omega|$ with a large value is displayed in red, whereas $|\omega|$ with a small value is displayed in blue. Then, the vortex intensity is displayed in terms of a color distribution, enabling the direction of the vortex center to be understood.

Furthermore, in addition to the display of the surface shape of the vertices based on polygons, the translucent display of the surface shape may be provided so that the vortex center line and region based on the text data may be superimposed on the surface shape. Moreover, in the above-described display modes, a cross section may be displayed so as to allow the inside of the vortices to be observed.

Now, display examples will be described with reference to the drawings.

Figure 17:
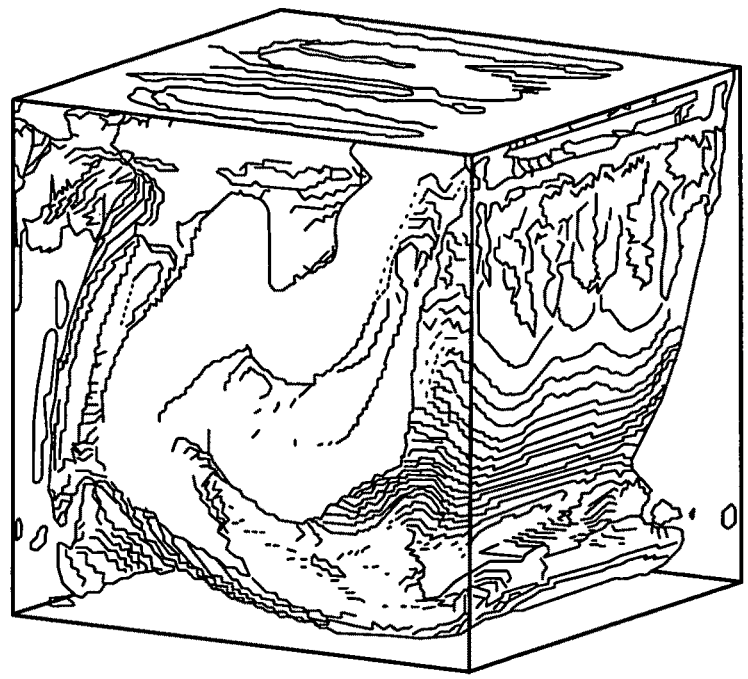
FIG. 17 is a diagram illustrating an example of vortex display.

FIG. 17 is a diagram illustrating an example of vortex display.

Here, a fluid is filled in a cubic. Vortices are illustrated which are extracted based on a flow velocity distribution created by simulating the case where the top surface of the cubic is moved at a constant speed. Furthermore, the magnitude of $|\omega|$ of the surface of the vortices may be expressed by shading.

Figure 18:
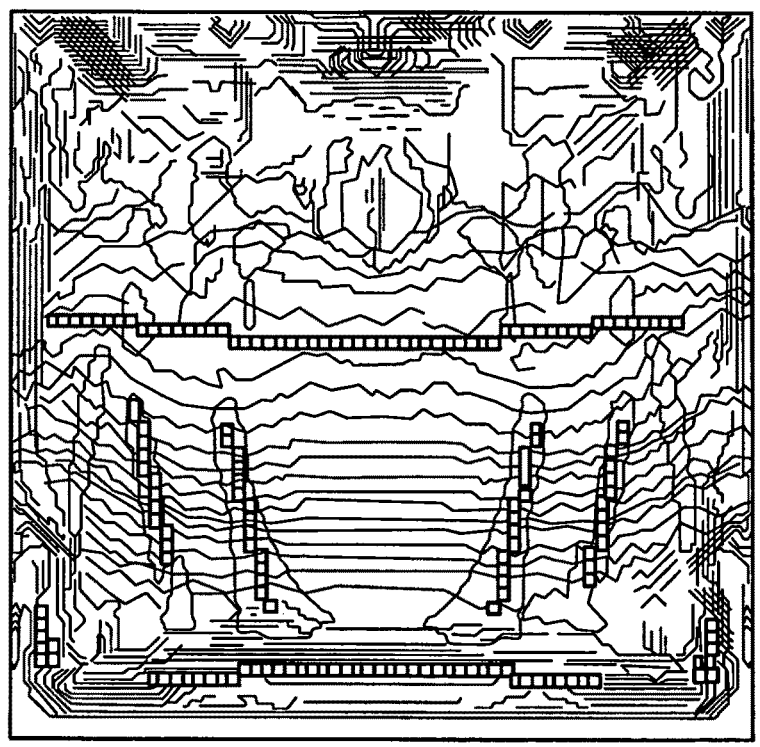
FIG. 18 is a diagram translucently illustrating vortices as seen from a direction in which the center line extends in a lateral direction.
Figure 19:
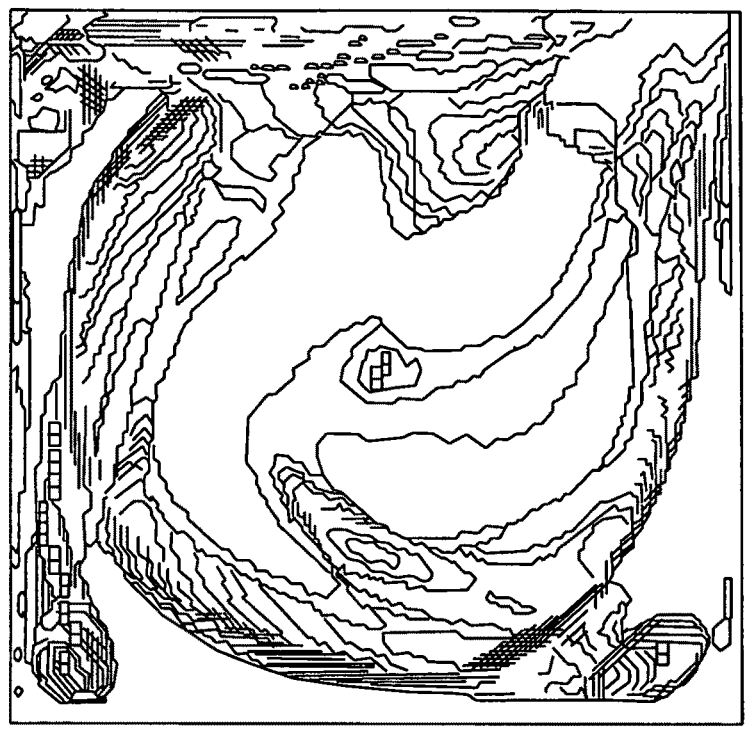
FIG. 19 is a diagram translucently illustrating vortices as seen from a direction in which the center line extends perpendicularly to the sheet of FIG. 19.

FIG. 18 is a diagram translucently illustrating vortices as viewed from a direction in which the center line extends in the lateral direction. FIG. 19 is a diagram translucently illustrating the vortices as viewed from a direction in which the center line extends perpendicularly to the sheet of FIG. 19.

FIGS. 18 and 19 illustrate voxels for which the value Vc corresponding to the center line is set.

Figure 20:
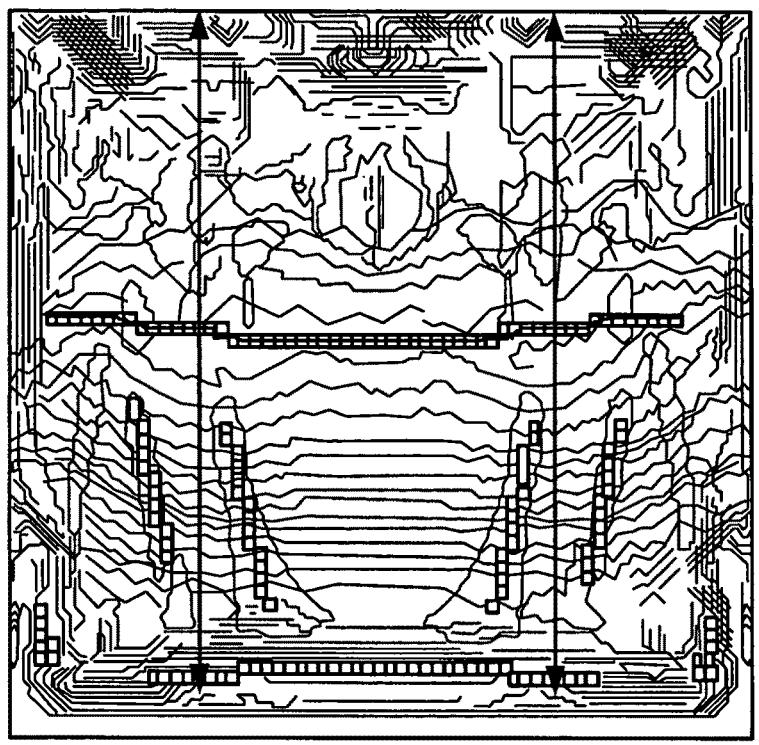
FIG. 20 is a diagram illustrating the display screen in FIG. 18 on which the center line and lines illustrating the vortex region are further superimposed.
Figure 21:
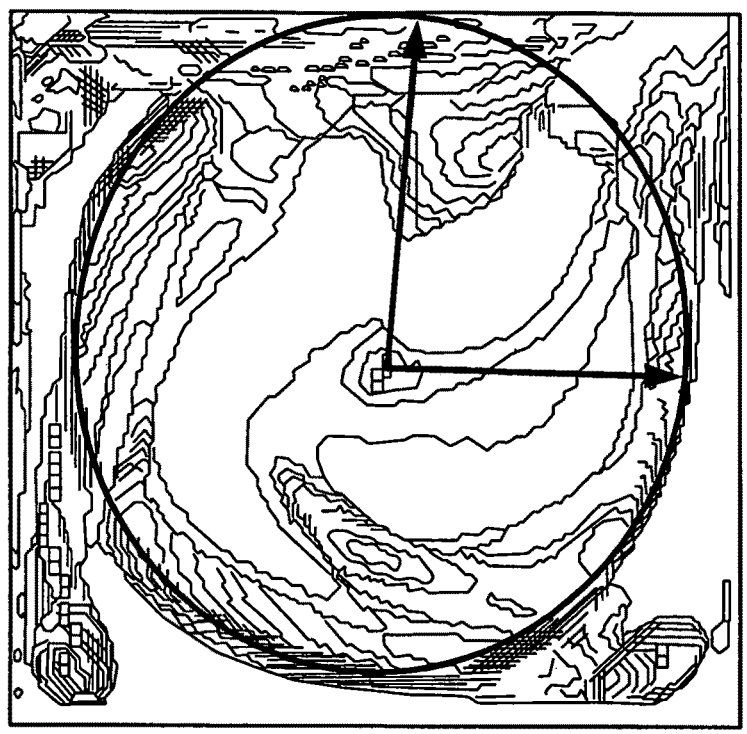
FIG. 21 is a diagram illustrating the display screen in FIG. 19 on which the center line and lines illustrating the vortex region are further superimposed.

FIGS. 20 and 21 are diagrams corresponding to the display screens in FIGS. 18 and 19 on which the center line and lines representing the segment region representing the vortex center are further superimposed.

According to the present embodiment, the vortices may be displayed in such various modes at a sufficient drawing speed. Furthermore, according to the present embodiment, text data on the segment representing the vortex center is created by calculations with a high resolution obtained before the integration of the voxels. This allows possible missing of preferable information to be avoided.

Figure 22:
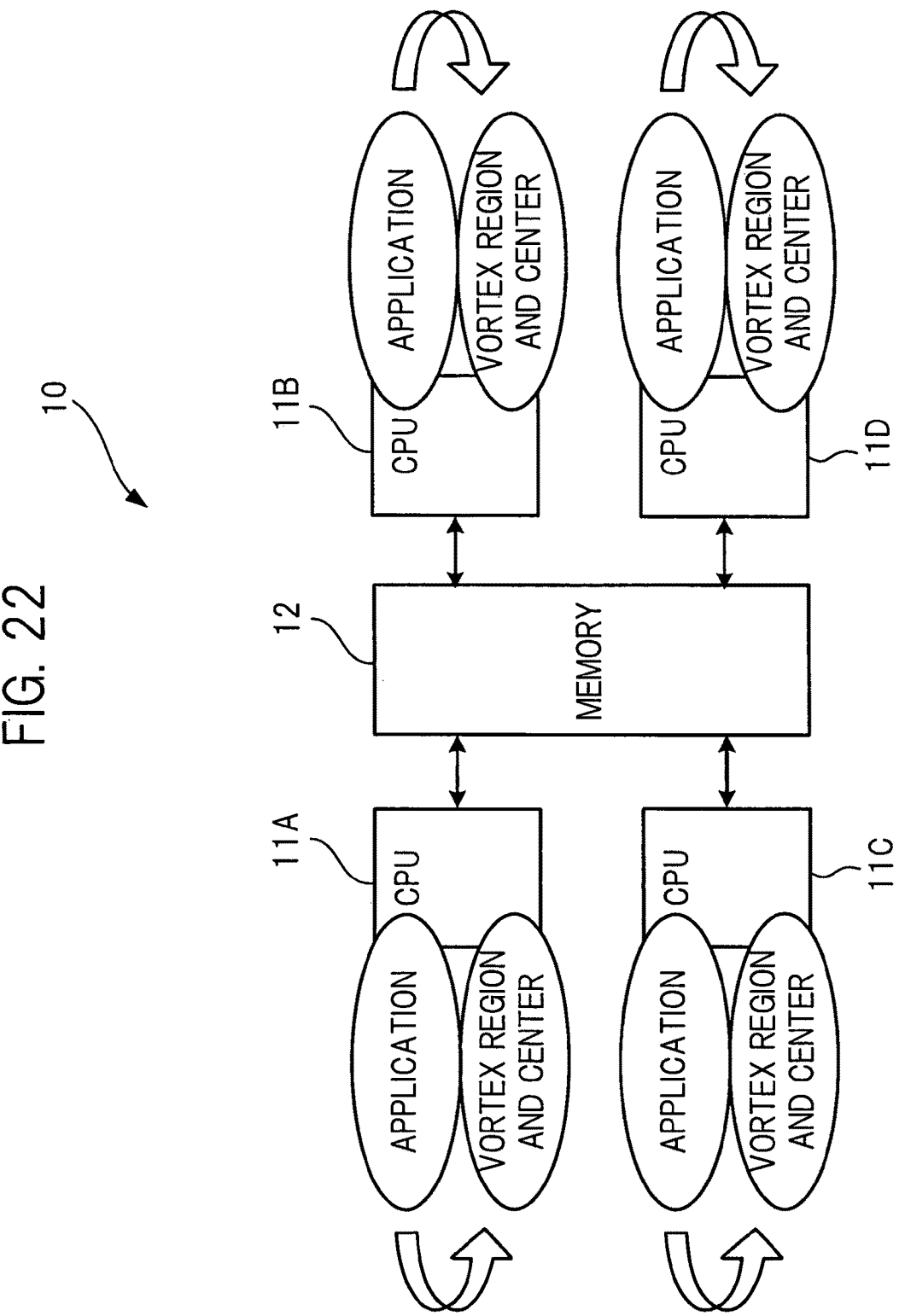
FIG. 22 is a diagram illustrating a modification of the present embodiment.

FIG. 22 is a diagram illustrating a modification of the present embodiment.

FIG. 22 illustrates a large-scale computer that is the same as the large-scale computer 10 illustrated in FIG. 5. In the description of FIG. 5, data indicative of the flow velocity distribution in the fluid space is stored in the file server 20 (see FIG. 1). In contrast, in FIG. 22, simulation for determining the flow velocity distribution in the fluid space is also performed by the large-scale computer 10. The fluid space is split into regions assigned to the respective CPUs 11A to 11D. Each of the CPUs 11A to 11D first calculates the flow velocity distribution in the corresponding region by simulation, and then extracts vortices. When the vortex extraction is finished, the simulated flow velocity distribution calculation is carried out on the next point in time, and vortices at that point in time are then extracted. The CPUs 11A to 11D in FIG. 22 alternately carry out the simulated flow velocity distribution calculation and the vortex extraction. Thus, in the present case, the large-scale computer 10 may avoid specializing in vortex extraction and may be used for the simulated flow velocity distribution calculation.

According to the present embodiment and the like, the text data indicative of the center line and size of the vortex region is created based on the flow velocity data with a relatively high resolution. These preferable pieces of information are created first. Therefore, even when voxel data, polygon data, and the like are reduced to perform display in an apparatus with specifications inferior to those of the vortex extraction apparatus according to the present embodiment and the like, the vortex display process may be carried out at a high speed without missing preferable information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A vortex extraction apparatus comprising:
   a data acquisition section that acquires flow velocity data at a plurality of points distributed in a fluid space;
   a first numerical data calculation section that calculates, for each vertex of each of voxels into which the inside of the fluid space is split, first numerical data indicating whether the vertex is located inside or outside a vortex region in the fluid, based on the flow velocity data acquired by the data acquisition section;
   a text data creation section that determines a center line of the vortex in the fluid based on the flow velocity data acquired by the data acquisition section and determines the size of the vortex region around the center line based on the first numerical data on each vertex calculated by the first numerical data calculation section, the text data creation section creating text data indicative of the center line and the size;
   a polygon count reduction processing section that counts the number of polygons defining a surface of the vortex region and each including an isosurface of the first numerical data calculated by the first data calculation section and integrates the plurality of voxels with new voxels into which the fluid space is roughly split until the number of polygons is equal to or smaller than a set value, to decimate the first numerical data and thereby obtain first numerical data corresponding to each vertex of each of the new voxels; and
   a data output section that outputs the text data created by the text data creation section and the first numerical data obtained by the polygon count reduction processing section and corresponding to each vertex of each of the new voxels.

2. The vortex extraction apparatus according to claim 1, further comprising a second numerical data calculation section that calculates, based on the flow velocity data acquired by the data acquisition section, second numerical data indicative of the intensity of the vortex in each of the voxels comprising the vortex region determined based on the first numerical data calculated by the first numerical data calculation section,
   wherein the polygon count reduction processing section decimates the first numerical data calculated by the first numerical data calculation section to the first numerical data corresponding to each vertex of each of the new voxels, and creates second numerical data corresponding to each of the new voxels based on the second numerical data calculated by the second numerical data calculation section, and
   the data output section outputs, in addition to the text data and the first numerical data, the second numerical data corresponding to the new voxels.

3. The vortex extraction apparatus according to claim 1, further comprising an interpolation operation section that performs an interpolation operation based on the flow velocity data acquired by the data acquisition section, thereby calculating flow velocity data on each vertex of each of a plurality of voxels when the fluid space is split into structured grids.

4. The vortex extraction apparatus according to claim 1, wherein a flow velocity gradient matrix of vertices of each voxel is representatively defined as:

$$J = \begin{pmatrix} u_x & u_y & u_z \\ v_x & v_y & v_z \\ w_x & w_y & w_z \end{pmatrix},$$

and
S and Q are defined as:

$$S = \frac{1}{2}(J + J^T)$$

$$Q = \frac{1}{2}(J - J^T)$$

where when flow velocities u, v, and w in x, y, and z directions in the fluid space are represented by q, and x, y, and z are represented by r, $$q_r = \frac{\partial q}{\partial r},$$

and
$J^T$ is a transposition matrix of a matrix J, and
   the first numerical data calculation section then determines an eigenvalue $\lambda_2$ corresponding to a median of three eigenvalues $\lambda_a, \lambda_b,$ and $\lambda_c$ of a matrix $A = S^2 + Q^2$ arranged in numerical order such that $\lambda_1 < \lambda_2 < \lambda_3$ (each of $\lambda_1, \lambda_2,$ and $\lambda_3$ is any of $\lambda_a, \lambda_b,$ and $\lambda_c$), and specifies numerical data associated with the eigenvalue $\lambda_2$ as the first numerical data.

5. The vortex extraction apparatus according to claim 2, wherein when a flow velocity vector of each of the voxels is defined as U, the second numerical data calculation section calculates:

$$|\omega| = |\nabla \times U|$$

where:

$$\nabla = \left(\frac{\partial}{\partial x}, \frac{\partial}{\partial y}, \frac{\partial}{\partial z}\right),$$

× denotes an outer product, and
   $|\omega|$ denotes the magnitude of ω, and
   the second numerical data calculation section thus determines numerical data associated with the $|\omega|$ to be the second numerical data.

6. The vortex extraction apparatus according to claim 1, wherein the text data creation section carries out, on a plurality of points of interest, a process of determining whether a point of interest in the fluid space is located on the center line based on a flow direction of the fluid represented by the flow velocity data on each of points around the point of interest, thereby determining the center line.

7. The vortex extraction apparatus according to claim 1, wherein the text data creation section determines the size of the vortex region to be a minimum distance and a maximum distance from a representative point on the center line to the vortex region surface in a surface extending in a direction in which the center line crosses the surface.

8. A non-transitory computer-readable storage medium that stores a vortex extraction program executed by an arithmetic apparatus that executes a program and causing the arithmetic apparatus to operate as a vortex extraction apparatus comprising:
   a data acquisition section that acquires flow velocity data at a plurality of points distributed in a fluid space;
   a first numerical data calculation section that calculates, for each vertex of each of voxels into which the inside of the fluid space is split, first numerical data indicating whether the vertex is located inside or outside a vortex region in the fluid, based on the flow velocity data acquired by the data acquisition section;
   a text data creation section that determines a center line of the vortex in the fluid based on the flow velocity data acquired by the data acquisition section and determines the size of the vortex region around the center line based on the first numerical data on each vertex calculated by the first numerical data calculation section, the text data creation section creating text data indicative of the center line and the size;
   a polygon count reduction processing section that counts the number of polygons defining a surface of the vortex region and each including an isosurface of the first numerical data calculated by the first data calculation section and integrates the plurality of voxels with new voxels into which the fluid space is roughly split until the number of polygons is equal to or smaller than a set value, to decimate the first numerical data and thereby obtain first numerical data corresponding to each vertex of each of the new voxels; and
   a data output section that outputs the text data created by the text data creation section and the first numerical data obtained by the polygon count reduction processing section and corresponding to each vertex of each of the new voxels.

9. A vortex extraction method, comprising:
   acquiring flow velocity data at a plurality of points distributed in a fluid space;
   calculating, for each vertex of each of voxels into which the inside of the fluid space is split, first numerical data indicating whether the vertex is located inside or outside a vortex region in the fluid, based on the acquired flow velocity data;
   determining a center line of the vortex in the fluid based on the acquired flow velocity data, determining the size of the vortex region around the center line based on the calculated first numerical data on each vertex, and creating text data indicative of the center line and the size;
   counting the number of polygons defining a surface of the vortex region and each including an isosurface of the calculated first numerical data, and integrating the plurality of voxels with new voxels into which the fluid space is roughly split until the number of polygons is equal to or smaller than a set value, to decimate the first numerical data and thereby obtain first numerical data corresponding to each vertex of each of the new voxels; and
   outputting the created text data and the obtained first numerical data corresponding to each vertex of each of the new voxels.

10. A vortex extraction display system comprising:
   a vortex extraction apparatus that creates data indicative of a vortex in a fluid space based on flow velocity data on each of a plurality of points distributed in the fluid space; and
   a vortex display apparatus that receives the data created by the vortex extraction apparatus to display the vortex,
   wherein the vortex extraction apparatus comprises:
   a data acquisition section that acquires flow velocity data at a plurality of points distributed in a fluid space,
   a first numerical data calculation section that calculates, for each vertex of each of voxels into which the inside of the fluid space is split, first numerical data indicating whether the vertex is located inside or outside a vortex region in the fluid, based on the flow velocity data acquired by the data acquisition section,
   a text data creation section that determines a center line of the vortex in the fluid based on the flow velocity data acquired by the data acquisition section and determines the size of the vortex region around the center line based on the first numerical data on each vertex calculated by the first numerical data calculation section, the text data creation section creating text data indicative of the center line and the size,
   a polygon count reduction processing section that counts the number of polygons defining a surface of the vortex region and each including an isosurface of the first numerical data calculated by the first data calculation section and integrates the plurality of voxels with new voxels into which the fluid space is roughly split until the number of polygons is equal to or smaller than a set value, to decimate the first numerical data and thereby obtain first numerical data corresponding to each vertex of each of the new voxels, and
   a data output section that outputs the text data created by the text data creation section and the first numerical data obtained by the polygon count reduction processing section and corresponding to each vertex of each of the new voxels.

* * * * *